(12) United States Patent
Rossing

(10) Patent No.: US 12,415,316 B2
(45) Date of Patent: Sep. 16, 2025

(54) FILAMENT FEEDING ASSEMBLY FOR FUSED FILAMENT FABRICATION SYSTEM

(71) Applicant: ULTIMAKER B.V., Geldermalsen (NL)

(72) Inventor: Lars Rossing, Geldermalsen (NL)

(73) Assignee: ULTIMAKER B.V., Geldermalsen (NL)

( * ) Notice: Subject to any disclaimer, the term of this patent is extended or adjusted under 35 U.S.C. 154(b) by 149 days.

(21) Appl. No.: 18/553,846

(22) PCT Filed: Apr. 26, 2022

(86) PCT No.: PCT/NL2022/050221
§ 371 (c)(1),
(2) Date: Oct. 4, 2023

(87) PCT Pub. No.: WO2022/231421
PCT Pub. Date: Nov. 3, 2022

(65) Prior Publication Data
US 2024/0181706 A1    Jun. 6, 2024

(30) Foreign Application Priority Data
Apr. 28, 2021   (NL) ..................... 2028080

(51) Int. Cl.
*B29C 64/336* (2017.01)
*B29C 64/118* (2017.01)
(Continued)

(52) U.S. Cl.
CPC .......... *B29C 64/336* (2017.08); *B29C 64/118* (2017.08); *B29C 64/209* (2017.08);
(Continued)

(58) Field of Classification Search
None
See application file for complete search history.

(56) References Cited

U.S. PATENT DOCUMENTS 9,669,586 B2   6/2017  Page
10,456,968 B2  10/2019 Mandel et al.
(Continued)

FOREIGN PATENT DOCUMENTS

CN          109049709 A    12/2018
DE        102018002287 A1   9/2019
EP            3542992 A2 *  9/2019  ........... B29C 64/118

*Primary Examiner* — Yung-Sheng M Tsui
(74) *Attorney, Agent, or Firm* — Ipsilon USA—NLO

(57) ABSTRACT

Provided herein is a filament feeding assembly with a plurality of filament feeders arranged next to each other in a row. The filament feeding assembly has a first guide rail and a second guide rail, both arranged parallel to a straight line. The filament feeding assembly has first and second connectors movably coupled to the first and second guide rails, respectively. The filament feeding assembly has first and second suspensions arranged to adjustably couple the respective first and second connectors to the respective first and second guide rails. The first and second connectors pass each other by way of adjusting the distance between the first connector and the first guide rail and/or adjusting the distance between the second connector and the second guide rail.

10 Claims, 16 Drawing Sheets

(51) Int. Cl.
*B29C 64/209* (2017.01)
*B29C 64/393* (2017.01)
*B33Y 30/00* (2015.01)
*B33Y 50/02* (2015.01)

(52) U.S. Cl.
CPC ............ *B29C 64/393* (2017.08); *B33Y 30/00* (2014.12); *B33Y 50/02* (2014.12)

(56) References Cited

U.S. PATENT DOCUMENTS

2020/0016840 A1   1/2020  Bracha et al.
2021/0221054 A1*  7/2021  Mark .................... B29C 69/001

* cited by examiner

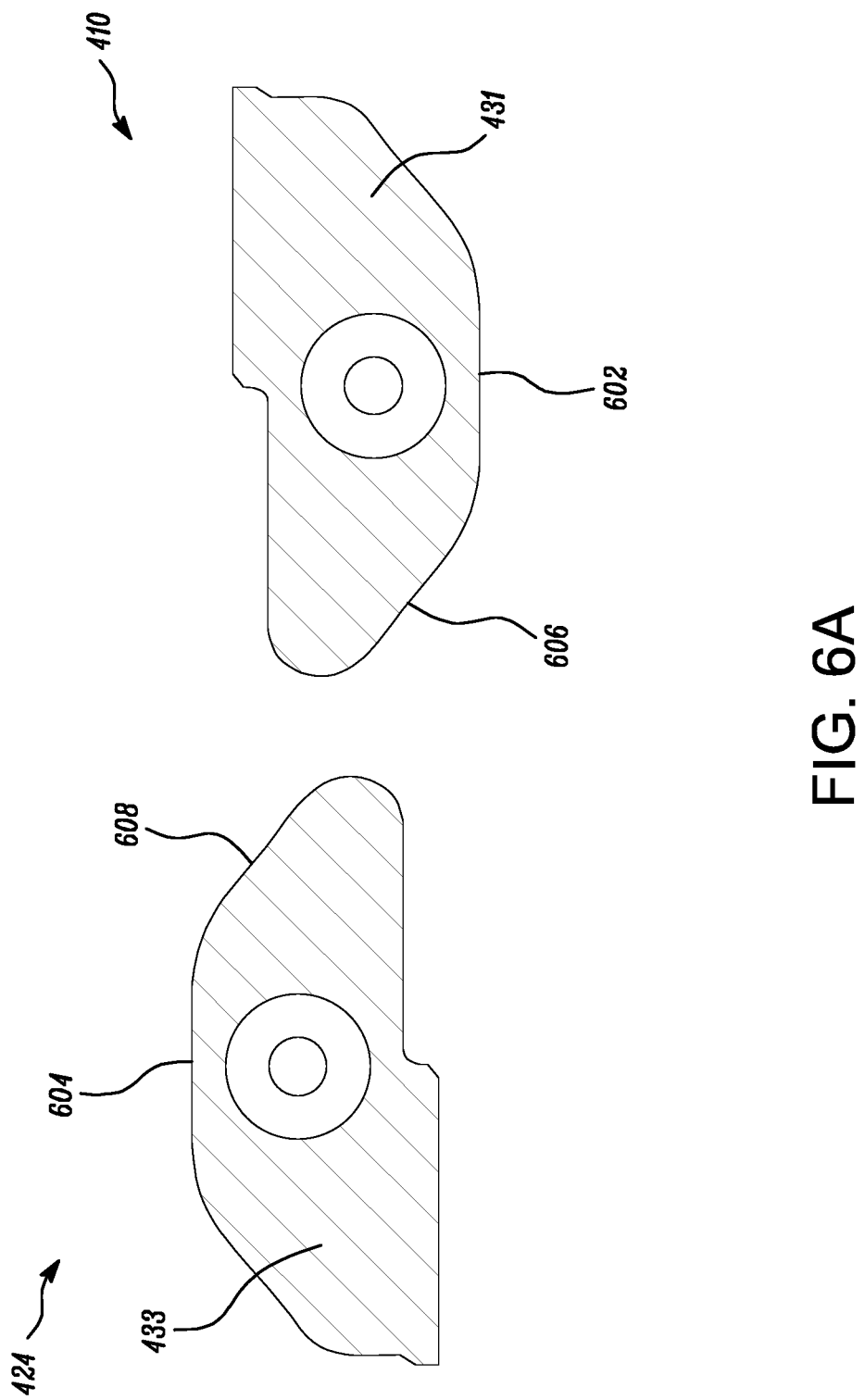

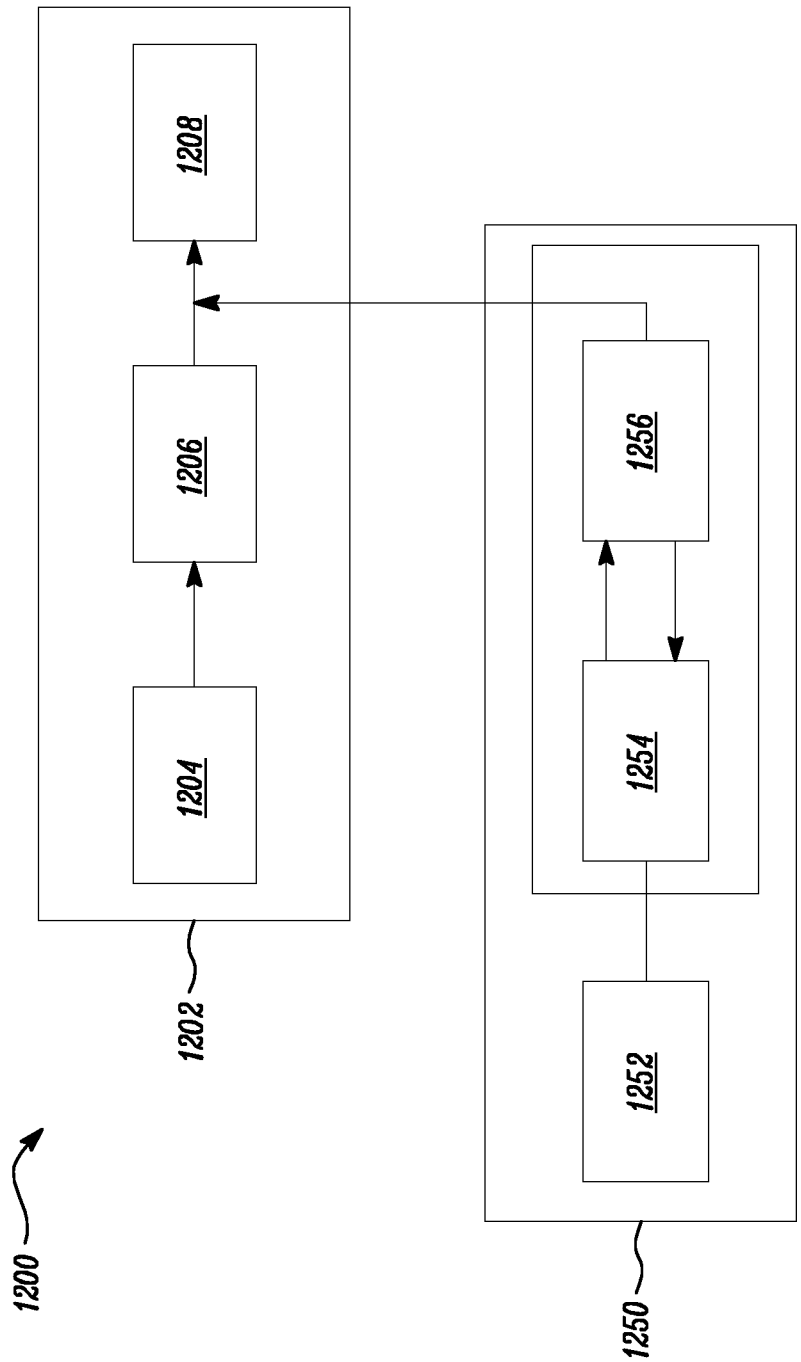

FILAMENT FEEDING ASSEMBLY FOR FUSED FILAMENT FABRICATION SYSTEM

FIELD OF THE INVENTION

The present invention relates to a filament feeding assembly for a fused filament fabrication (FFF) system. It also relates to a fused filament fabrication system comprising such a filament feeding assembly.

BACKGROUND ART

Fused filament fabrication (FFF) is an additive manufacturing process that typically uses a continuous filament of a thermoplastic material. The filament may be fed from a filament supply to a moving, heated print head, and may be deposited through a print nozzle onto an upper surface of a build plate. Further, the print head may be moved relative to the build plate under computer control to define a printed shape. In certain FFF systems, the print head may move in two dimensions to deposit one horizontal plane, or a layer, at a time. A work is therefore formed by the deposited layers. The work or the print head may then be moved vertically by a small amount to begin a new layer. In this manner, a 3D-object may be produced out of the thermoplastic material.

Some print heads may utilize multiple extruders to deposit different thermoplastic materials or a combination thereof. The ability to extrude different thermoplastic materials may allow selection and use of different thermoplastic materials based on desired physical properties and/or geometry of the 3D-object. The different thermoplastic materials may also be selected based on intended applications. For example, some print heads may utilize a pair of extruders that may selectively extrude a part material and a support material. Using multiple extruders in a single printing system may require appropriate selection of a filament to be fed to the extruder that is operational at a given time.

U.S. Pat. No. 9,669,586 discloses a material dispensing system. The material dispensing system comprises a single drive motor attached to an additive manufacturing system via a motor mount. The material dispensing system further comprises a multi-material filament drive system, which is powered by the single drive motor via a flexible drive shaft. The filament drive system comprises a plurality of filament drives for a respective plurality of filaments. Rotary motion is transferred from the single drive motor to a selected one of filament drives. The motor enables the dispensing of an associated filament from the selected one of filament drives. The material dispensing system may be required to have a plurality of paths for the plurality of filaments dispensed by associated filament drives. This may increase the complexity of the material dispensing system. Further, the filaments are dispensed through separate filament drives, and thus feed force for each filament may be different, which may lead to uneven extrusion of filaments.

SUMMARY OF THE INVENTION

The aim of the present invention is to provide an improved filament feeding assembly for a fused filament fabrication (FFF) system.

According to a first aspect of the present invention, there is provided a filament feeding assembly for a fused filament fabrication (FFF) system comprising a plurality of filament feeders arranged next to each other in a row. Each filament feeder comprises an outlet. The respective outlets of the filament feeders are aligned on a straight line. The filament feeding assembly further comprises a first guide rail and a second guide rail, both being arranged parallel to the straight line. The filament feeding assembly further comprises a first connector movably coupled to the first guide rail and comprising a first filament entrance for selectively receiving a filament from one of the outlets. The filament feeding assembly further comprises a second connector movably coupled to the second guide rail and comprising a second filament entrance for selectively receiving a filament from one of the outlets. The filament feeding assembly further comprises two actuators, each being arranged to move one of the connectors in front of the respective outlets of the filament feeders. The filament feeding assembly further comprises a first suspension arranged to adjustably couple the first connector to the first guide rail, so that a distance between the first guide rail and the first connector is adjustable. The filament feeding assembly further comprises a second suspension arranged to adjustably couple the second connector to the second guide rail, so that a distance between the second guide rail and the second connector is adjustable. The first and second connectors are arranged to pass each other by way of adjusting the distance between the first connector and the first guide rail and/or adjusting the distance between the second connector and the second guide rail.

The filament feeding assembly of the present invention may allow selective feeding of any two filaments from a plurality of filaments. The filament feeding assembly comprises two connectors that are movable in the filament feeding assembly and are arranged to move to and selectively engage with any of the plurality of feeders and receive respective filaments therefrom. Each of the connectors may be coupled to a Bowden tube that transports the filament received at the respective connector. Each of the connectors may be part of a so-called selector comprising a corresponding connector and a corresponding suspension. For example, a first selector comprises the first connector and the first suspension. Further, a second selector comprises the second connector and the second suspension.

The filament may be transported to a secondary feeder and then to a print head of the FFF system, or directly to the print head. In the case of a dual extruder print head of the FFF system, each connector feeds filaments to one of the extruders. The filament feeding assembly is arranged, such that filament is fed to one of the extruders of the print head through common channels, via one of the connectors. As a result, characteristics of the filament being fed to the print head, such as friction values and feed force values, are similar, irrespective of the feeder from where the filament is fed. This may allow the FFF system to extrude the filaments more reliably and more uniformly.

Further, since there is a single path for the filament to traverse, the FFF system comprising the proposed filament feeding assembly does not require a merger. This may further reduce friction that may otherwise occur due to movement of the filament through the merger. Specifically, in some cases, the proposed filament feeding assembly can be used without the merger. Hence, the path for the filament from the feeder to the print head may be reduced, which further reduces the friction for the filament and also leads to less wasted material. Further, moisture ingress into the filament path is limited.

Additionally, the filament feeding assembly may be automated. Since there are two connectors, the chances of filaments being fed in a wrong order is minimized.

In an embodiment, each of the first and second connectors comprises a wedge-shaped outer wall. Each of the first and second suspensions may comprise a resilient member. The resilient member is arranged to resiliently deform when the outer wall of the first connector pushes against the outer wall of the second connector.

In an embodiment, the resilient member comprises a curved member fixedly coupled to the respective connector. Such a curved member can be an integral part with the body of the connector and is easy to manufacture and requires little or no maintenance. The curved member may be manufactured using a plastic or other flexible material such as a metal. It is noted that a thickness of the curved member is chosen so that the member is both strong and flexible as is appreciated by the skilled person.

In an embodiment, the resilient member comprises a coil spring. The coil spring compresses when the outer wall of one of the connectors pushes against the outer wall of the other connector. The spring coils are passive elements and are compressed due to force acting on respective selectors.

In an embodiment, at least one of the first and second suspensions comprises a telescoping mechanism. The telescoping mechanisms can be actuated using any suitable actuator. This may allow active and accurate adjustment of the selectors.

In an embodiment, each of the filament feeders comprises a dock. Each of the connectors may comprise a protrusion arranged to be received in the dock of the filament feeder. The dock restricts motion of the protrusion, and consequently, the connector as such, once the protrusion is received in the dock. This may allow filament to be fed from the feeder to the connector smoothly without any undesired relative movement between the connector and the filament feeder in a coupled state.

In an embodiment, each of the filament feeders comprises a sensor arranged to generate a signal indicative of an engagement of one of the connectors with the filament feeder. The filament feeding assembly may be arranged such that a filament feeder begins feeding the corresponding filament only after the signal is generated indicative of the engagement of one of the connectors with the filament feeder.

In an embodiment, the filament feeding assembly further comprises a controller arranged to determine target feeders from the plurality of filament feeders for the connectors. The controller is arranged to control the actuators to move each of the associated connectors to one of the target feeders. The controller is then arranged to determine that the connectors are engaged with the target feeders. The controller is further arranged to operate the target feeders to feed filament through the connectors.

In an embodiment, the controller is further arranged to move at least the first connector towards the one of the target feeders. The controller is then arranged to determine that the first connector is proximal to the second connector. The controller is arranged to control the first suspension, such that the first connector is retracted towards the first guide rail, in order to allow the first connector to pass the second connector. The controller may be further arranged to control the first suspension, such that the first connector moves to a non-retracted state after the first connector has passed the second connector.

The use of the controller may allow accurate operation of the filament feeding assembly. Further, the controller may be provided with a transceiver unit that allows the controller to receive and send instructions wirelessly and remotely.

According to a second aspect of the present invention, there is provided a fused filament fabrication system comprising the filament feeding assembly of the first aspect. The proposed filament feeding assembly may provide a common path for the filaments to be extruded by the fused filament fabrication system, and thereby enables the fused filament fabrication system to extrude filaments uniformly.

BRIEF DESCRIPTION OF THE DRAWINGS

These and other aspects of the invention are apparent from and will be elucidated with reference to the embodiments described hereinafter. In the drawings, These and other aspects of the invention are apparent from and will be elucidated with reference to the embodiments described hereinafter. In the drawings, FIG. 1 schematically shows a side view of a fused filament fabrication (FFF) system, according to an embodiment of the present invention;

FIG. 6A schematically shows cross-sectional views of first and second connectors of the filament feeding assembly, according to an embodiment of the present invention;

FIG. 12 schematically shows a state diagram for one of the filament feeders of the filament feeding assembly.

It should be noted that items which have the same reference numbers in different FIGURES, have the same structural features and the same functions, or are the same signals. Where the function and/or structure of such an item has been explained, there is no necessity for repeated explanation thereof in the detailed description.

DETAILED DESCRIPTION OF EMBODIMENTS

In a fused filament fabrication (FFF) process, a strand or filament of a material, such as a thermoplastic material, is forced through a heated extruder nozzle, which is arranged and controlled to deposit layers of molten filament on a print bed.

Figure 1:
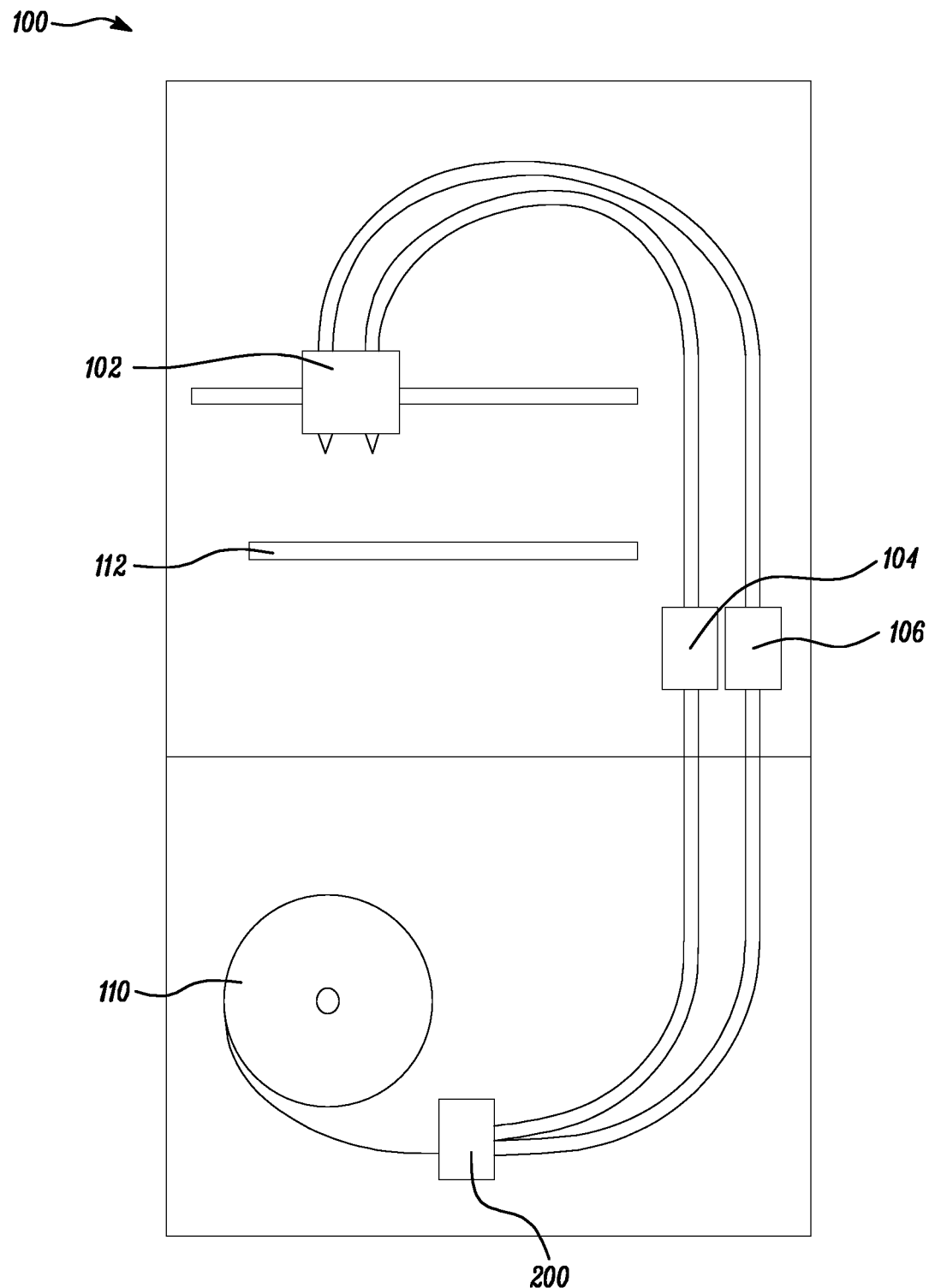

FIG. 1 schematically shows a side view of a fused filament fabrication (FFF) system 100, according to an embodiment of the present invention. The FFF system 100 comprises a dual extruder print head 102. The print head 102 is fed respective filaments from two feeders 104, 106. The two feeders 104, 106 are, in turn, fed filament from a filament feeding assembly 200. The filament feeding assembly 200 is arranged to receive filament from a number of filament spools 110. Once filament is loaded from the feeders 104, 106 via the filament feeding assembly 200, the print head 102 is able to deposit extruded filament onto a print bed 112. A dual extruder print head, also referred to as dual nozzle print head, provides many advantages to the user as compared to a single nozzle print head, as will be appreciated by the skilled person.

It is noted that the feeders 104, 106 may be arranged within or on the print head 102 resulting in a so-called direct drive printing system. Furthermore, it is conceivable that the feeders 104, 106 are absent and that the filament feeding assembly 200 is directly controlling a filament feeding speed to the print head 102.

Figure 2A:
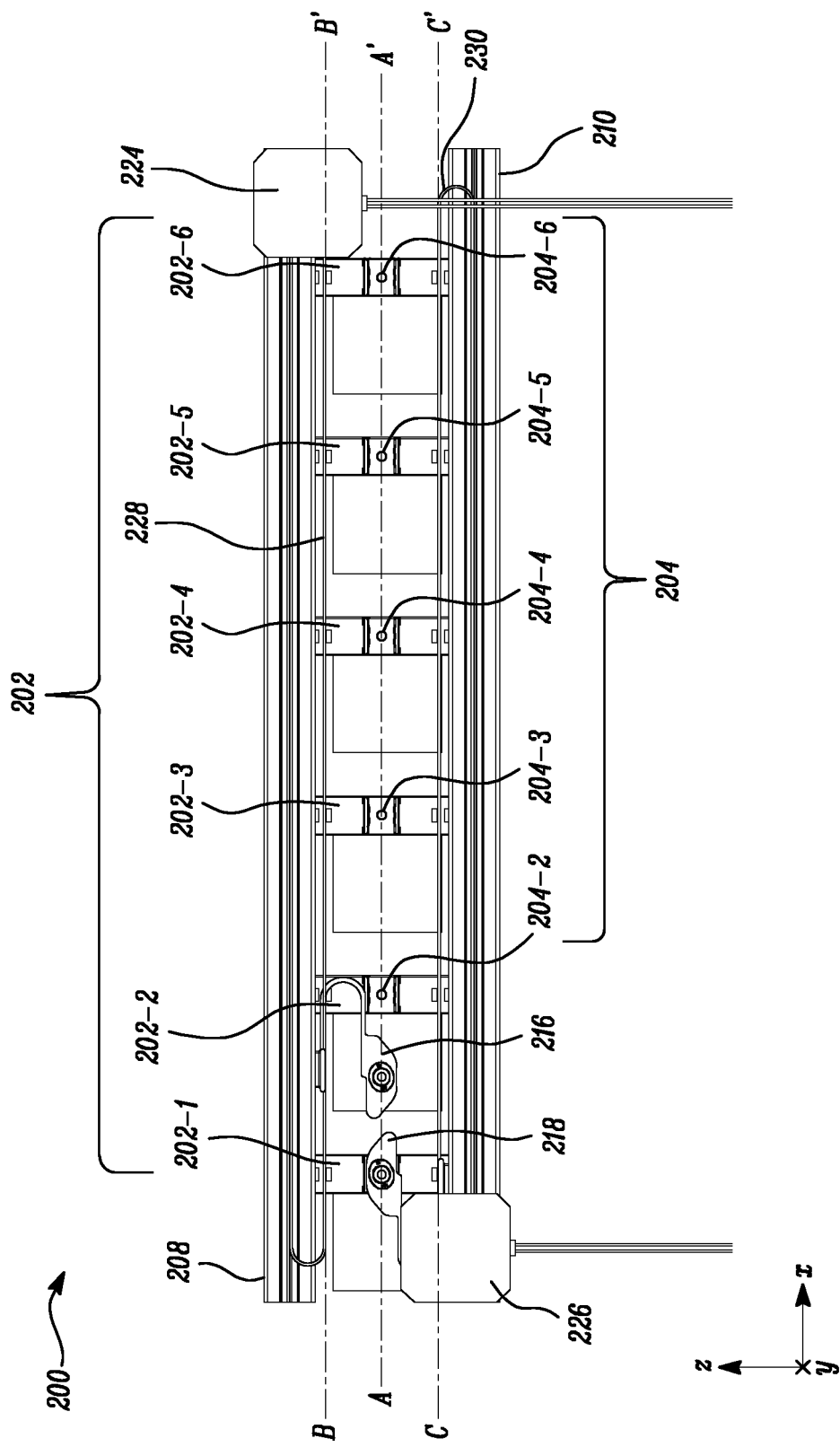
FIG. 2A schematically shows a front view of a filament feeding assembly of the FFF system, according to an embodiment of the present invention.
Figure 2B:
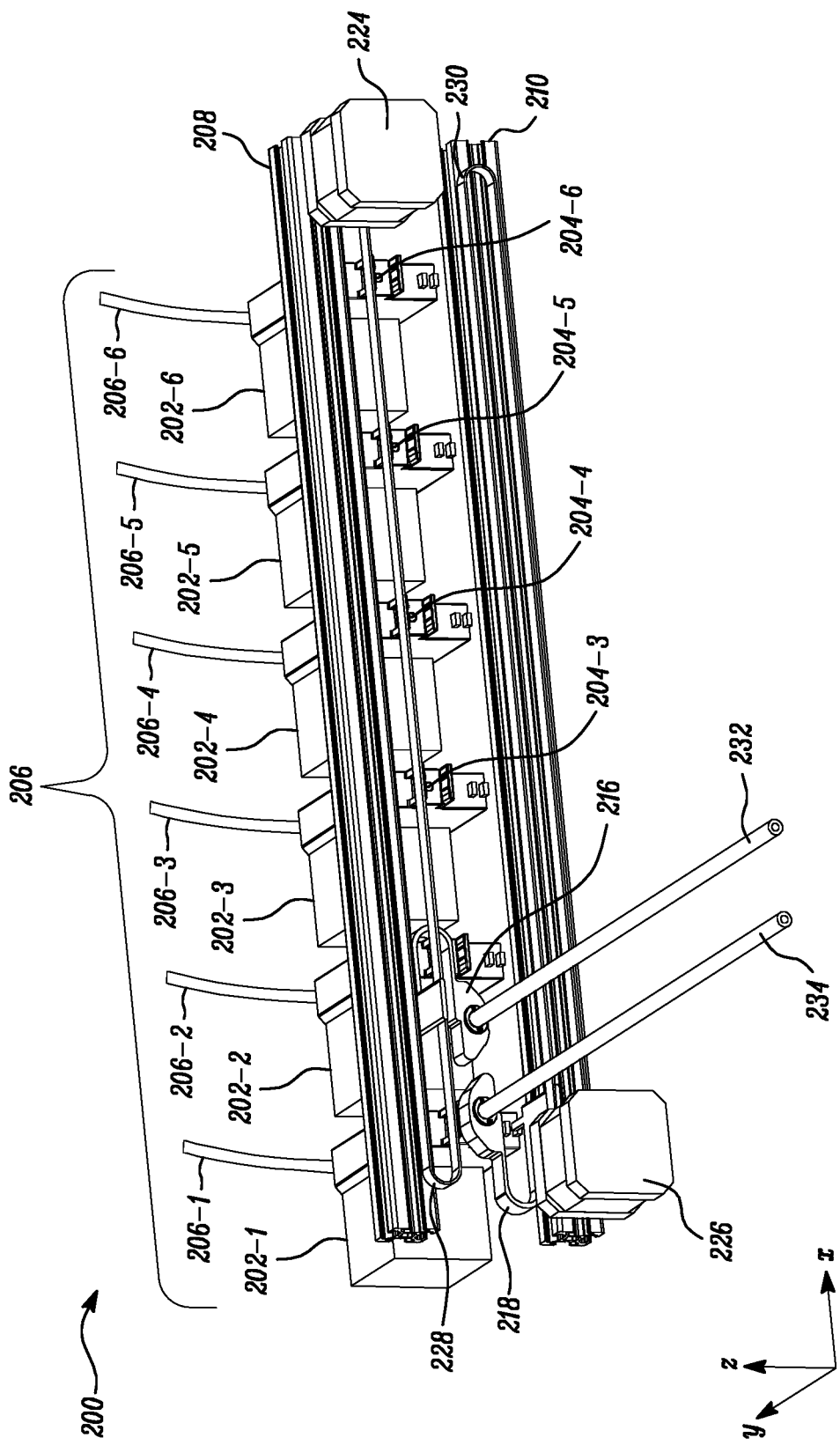
FIG. 2B schematically shows a top perspective view of the filament feeding assembly, according to an embodiment of the present invention.
Figure 2C:
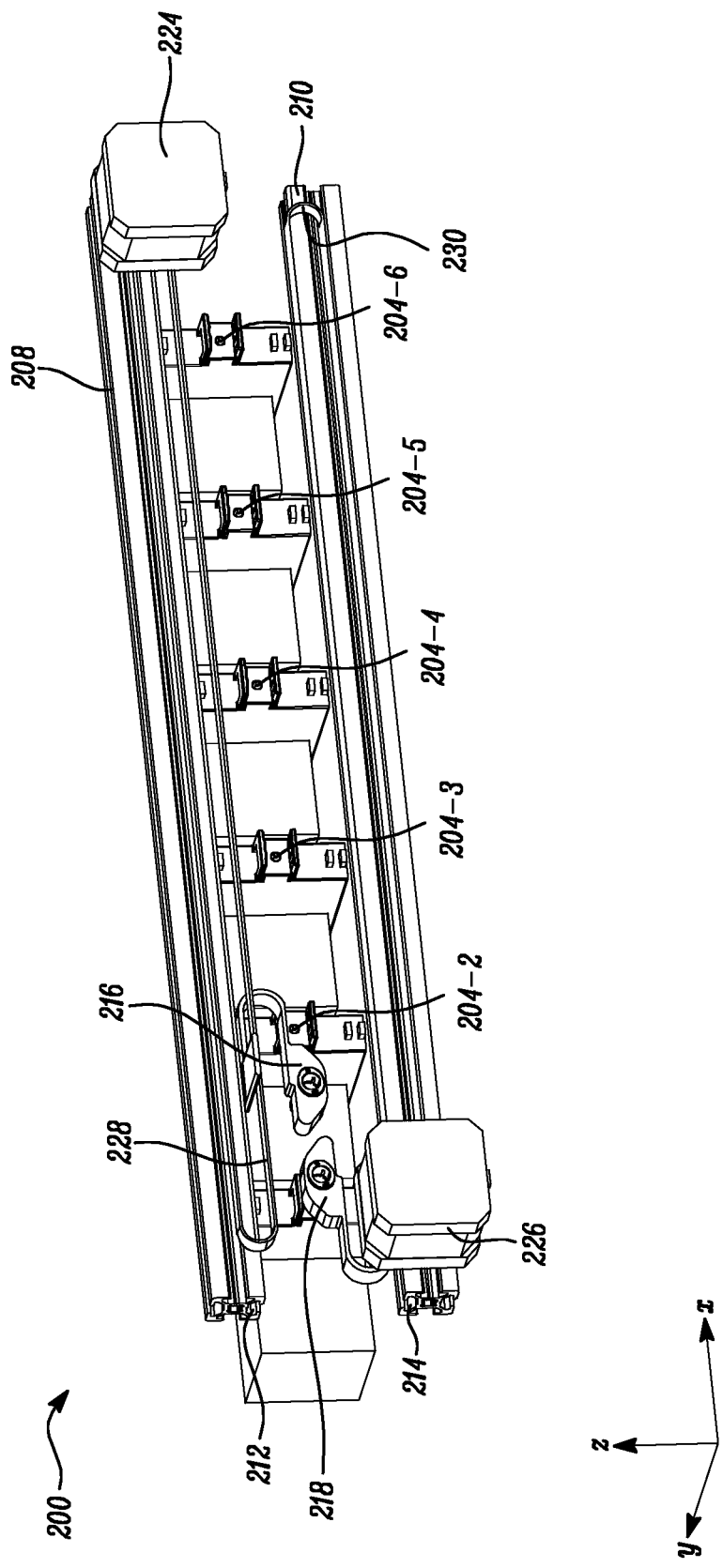
FIG. 2C schematically shows a side perspective view of the filament feeding assembly, according to an embodiment of the present invention.

FIGS. 2A-2C schematically show a front view, a top perspective view, and a side perspective view, respectively, of a specific filament feeding assembly 200 of the FFF system 100. The filament feeding assembly 200 is interchangeably referred to as "the assembly 200". In FIGS. 2A-2C mutually orthogonal x, y and z-axes are indicated. In this example, the x and y-axes are disposed along a horizontal plane of the assembly 200 and the z-axis is disposed orthogonal to the horizontal plane (i.e., x-y plane) of the assembly 200. It should however be noted that the orientation of the assembly 200 within the FFF system can be different from the orientation shown in the figures.

The assembly 200 comprises a plurality of filament feeders 202. The filament feeders 202 are interchangeably referred to as "feeders 202". In some embodiments, the filament feeders 202 are referred to as pre-feeders since they are arranged upstream from the feeders 104, 106 shown in FIG. 1. The plurality of filament feeders 202 are arranged next to each other in a row. Each filament feeder 202 comprises an outlet 204. In other words, the plurality of feeders 202 comprises a respective plurality of outlets 204. The plurality of feeders 202 are arranged such that the respective outlets 204 of the feeders 202 are aligned on a straight line A-A'. In the illustrated embodiment of FIGS. 2A-2C, the straight line A-A' is parallel to the x-axis.

The plurality of feeders 202 is arranged to selectively dispense respective plurality of filaments 206, see FIG. 2B. The plurality of filaments 206 are dispensed through the respective outlets 204. The plurality of filaments 206 generally comprise thermoplastic materials and may initially be stored on a spool. The filaments 206 may be of different types, each exhibiting different characteristics. In some embodiments, each feeder 202 from the plurality of feeders 202 dispenses respective filaments 206 that may be of a same type. In some other embodiments, each feeder 202 from the plurality of feeders 202 dispenses respective filaments 206 that may be of different types.

In the illustrated embodiment of FIGS. 2A-2C, the assembly 200 comprises six filament feeders 202-1, 202-2, 202-3, 202-4, 202-5, 202-6 (the filament feeders are collectively referred to by the numeral reference 202). The number of filament feeders may be different and depends on the requirements. The plurality of feeders 202 is arranged to selectively dispense respective filaments 206-1, 206-2, 206-3, 206-4, 206-5, 206-6 (the filaments are collectively referred to by the numeral reference 206) through their respective outlets 204-1 (shown in FIG. 3), 204-2, 204-3, 204-4, 204-5, 204-6 (the respective outlets are collectively referred to by the numeral reference 204).

The assembly 200 further comprises a first guide rail 208 and a second guide rail 210, both being arranged parallel to the straight line A-A'. In some embodiments, the first and second guide rails 208, 210 are arranged, such that the straight line A-A' is positioned between the first and second guide rails 208, 210. In some embodiments, the first guide rail 208 is arranged along a first axis B-B' and the second guide rail 210 is arranged along a second axis C-C', see also FIG. 2A. Therefore, the first axis B-B' and the second axis C-C' are both parallel to the straight line A-A'. Further, the first axis B-B' and the second axis C-C' are positioned such that the straight line A-A' is between the first axis B-B' and the second axis C-C'.

As is indicated in FIG. 2C, in this embodiment, the first and second guide rails 208, 210 define first and second channels 212, 214 respectively, extending at least partially along their respective lengths. Each of the first and second channels 212, 214 may have any suitable shape, for example, C-shaped, U-shaped, or any other shape based on application requirements.

In the embodiment of FIGS. 2A-2C, the assembly 200 further comprises a first and a second selector 216, 218. The first selector 216 is movably coupled to the first guide rail 208, and the second selector 218 is movably coupled to the second guide rail 210. The first and second selectors 216, 218 are movable relative to the plurality of feeders 202. The first and second selectors 216, 218 are movably coupled to the first and second guide rails 208, 210, respectively, such that the first and second selectors 216, 218 are movable at least partially along lengths of the first and second guide rails 208, 210, respectively. In other words, the first selector 216 is movable along the first axis B-B', and the second selector 218 is movable along the second axis C-C'. The first and second selectors 216, 218 are each arranged to engage with any one of the plurality of feeders 202, such that, upon engagement, the first and second selectors 216, 218 are arranged to receive the filament 206 from the respective feeders 202. In this embodiment, the first and second selectors 216, 218 are arranged to be at least partially and slidably received in the first and second channels 212, 214, respectively.

The assembly 200 further comprises two actuators 224, 226, each being arranged to move one of the selectors 216, 218 in front of the respective outlets 204 of the feeders 202. Specifically, each of the actuators 224, 226 is arranged to move an associated selector 216, 218 in front of the respective outlets 204 of the feeders 202. The two actuators 224, 226 are interchangeably referred to as first and second actuators 224, 226. In other words, the first and second actuators 224, 226 are arranged to move connectors 410, 424 (see also FIG. 4) of the first and second selectors 216, 218 respectively, in front of the respective outlets 204 of the feeders 202. In some embodiments, each of the first and second actuators 224, 226 may comprise stepper motors, dc motors, ac motors, and the like.

In this embodiment, the assembly 200 further comprises first and second drive mechanisms 228, 230 arranged to drivably couple the first and second selectors 216, 218 with the first and second actuators 224, 226, respectively. In other words, the first and second actuators 224, 226 effect movement of the first and second selectors 216, 218 through the first and second drive mechanisms 228, 230, respectively. In some embodiments, each of the first and second drive mechanisms 228, 230 may comprise a belt drive, a chain drive, a gear drive, a friction drive, or combinations thereof.

As can be seen from, e.g., FIG. 2B, the first and second selectors 216, 218 are inverted relative to each other, such that first and second guide couplers 402, 416 (see also FIG. 4) can each be coupled to different guide rails 208, 210 and driven by the associated drive mechanisms 228, 230.

In the embodiment of FIG. 2B, the first and second selectors 216, 218 are coupled to first and second Bowden tubes 232, 234, respectively. The first and second Bowden tubes 232, 234 are flexible hollow tubes that transport the respective filaments 206 from the first and second selectors 216, 218 towards the feeders 104, 106 (shown in FIG. 1).

Figure 3:
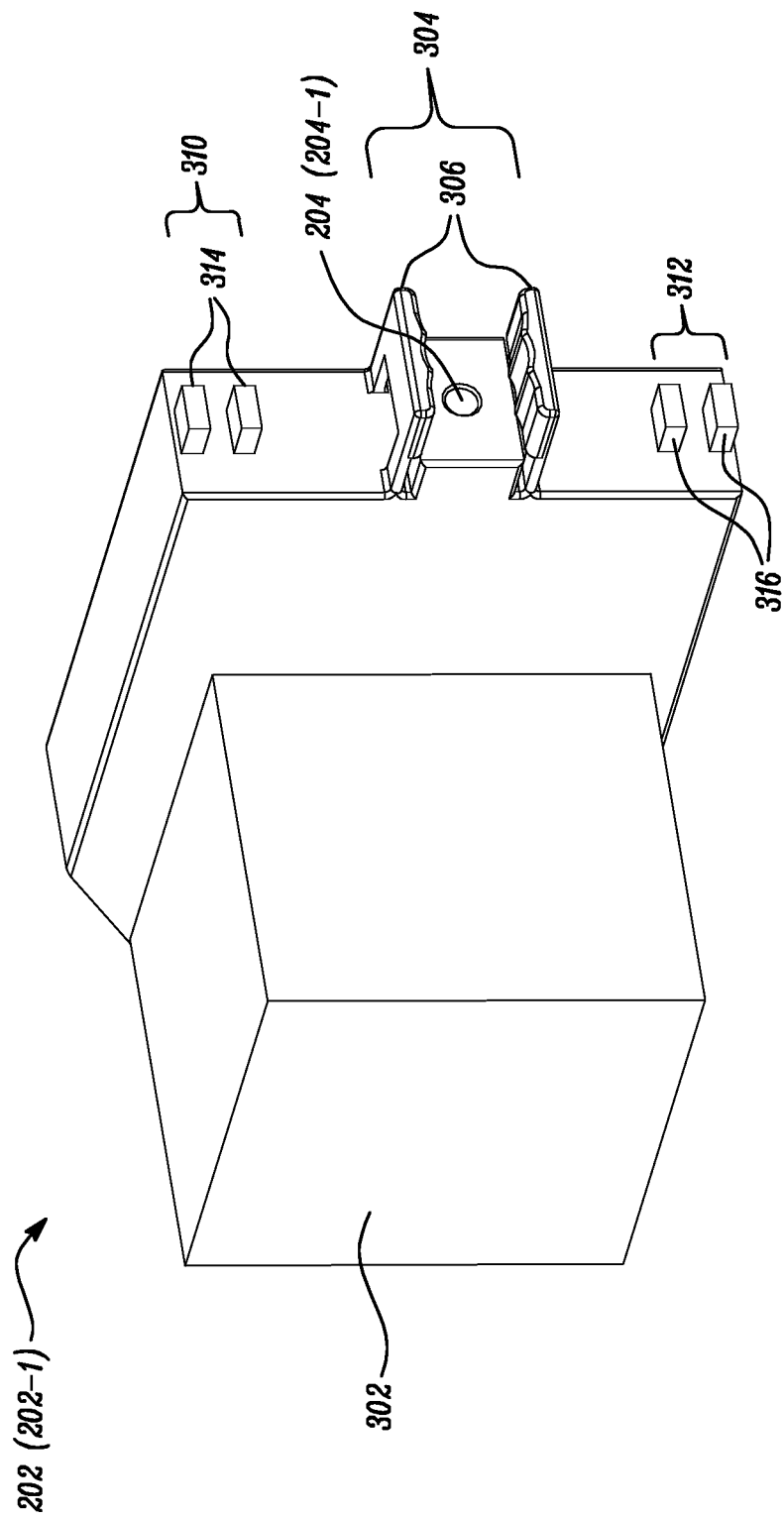
FIG. 3 schematically shows a perspective view of a filament feeder of the filament feeding assembly, according to an embodiment of the present invention.

FIG. 3 schematically shows a perspective view of one of the filament feeders 202 of the filament feeding assembly 200. Each of the plurality of feeders 202 may comprise a drive mechanism 302 such that, on actuation, it dispenses the respective filament 206 (shown in FIG. 2B) through the associated outlet 204 of the feeder 202. The drive mechanism 302 may comprise a motor such as a stepper motor, a dc motor, an ac motor, and the like. In case the filament feeder 202 corresponds to the filament feeder 202-1 (shown in FIG. 2A), the outlet 204 corresponds to the outlet 204-1.

In some embodiments, each of the plurality of feeders 202 comprises a dock 304. In some embodiments, the dock 304 comprises a pair of docking portions 306 spaced apart from each other. In this example, the pair of docking portions 306 are two protruding walls arranged to receive and selectively engage with protrusions 430, 432 of the connectors 410, 424 which will be discussed in more detail with reference to FIG. 4. Once the respective protrusion 430, 432 is engaged with the pair of docking portions 306 of the feeder 202, the respective connector 410, 424 is ready to receive the filament 206 dispensed from the outlet 204. In this example, the pair of docking portions 306 are arranged around the outlet 204 of the respective feeder 202, but alternatively the pair of docking portions 306 could be arranged remote from the outlet 204 to receive another part of the selectors 216, 218, depending on a configuration of the filament feeding assembly 200.

In the illustrated embodiment of FIG. 3, each of the filament feeders 202 comprises first and second sensors 310, 312 arranged to generate signals indicative of the engagement of the first and second connectors 410, 424 respectively, with the respective feeder 202. In some embodiments, the first sensor 310 comprises a first pair of sensor elements 314. Further, the second sensor 312 comprises a second pair of sensor elements 316. The first and second sensors 310, 312 may be contactless sensors arranged to detect the presence of a flag (e.g., first and second flags 408, 422, see also FIG. 4) of one of the first and second selectors 216, 218 as will be discussed with reference to FIG. 5.

Figure 4:
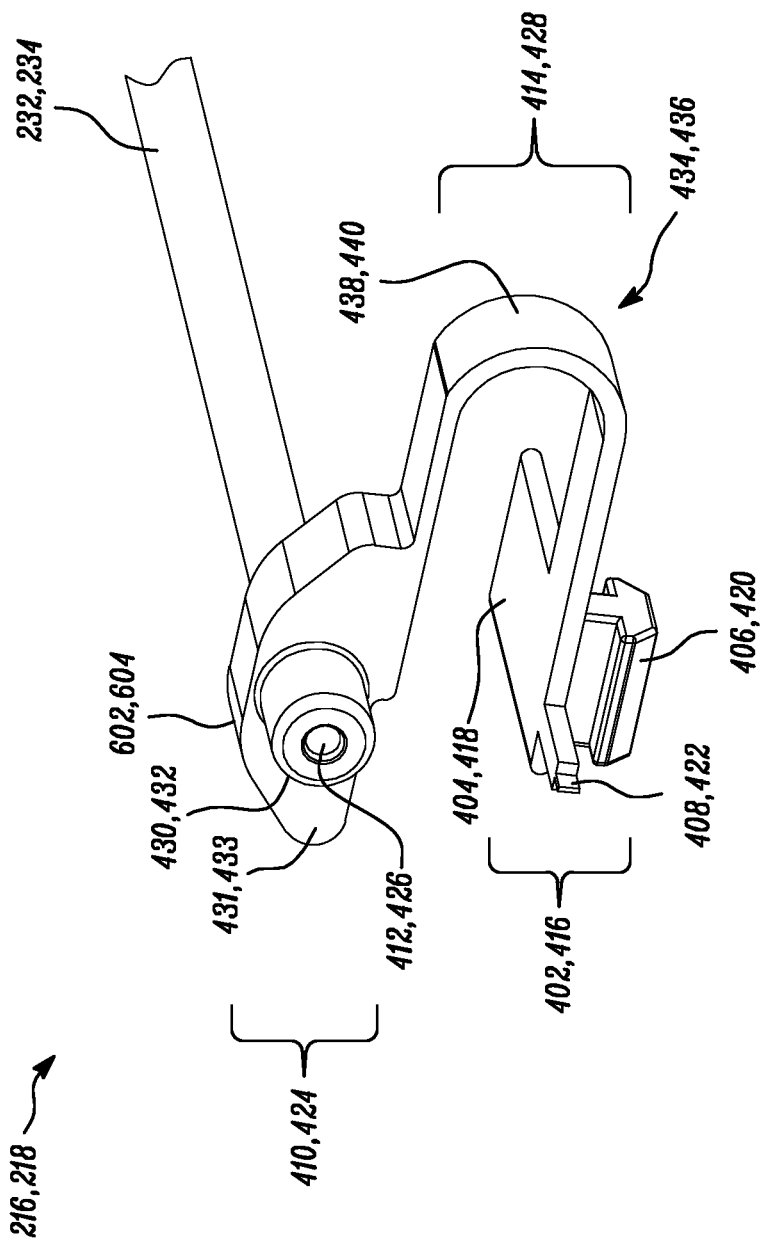
FIG. 4 schematically shows a perspective view of a selector of the filament feeding assembly, according to an embodiment of the present invention.

FIG. 4 schematically shows a perspective view of any one the first and second selectors 216, 218 of the filament feeding assembly 200. The first selector 216 comprises the first connector 410, a first suspension 414 and the first guide coupler 402. The first guide coupler 402 is movable by the first actuator 224 through the first drive mechanism 228, see also FIG. 2B. Consequently, the whole first selector 216 is movable by means of the first actuator 224 and the first drive mechanism 228. In this embodiment, the first guide coupler 402 comprises a first drive connection 404 and a first slide 406. The first drive connection 404 is arranged to be connected with the first drive mechanism 228. In case the first drive mechanism 228 comprises a belt, the first drive connection 404 is a belt connection arranged to be driven by the belt. Thus, in some embodiments, when the first actuator 224 drives the first drive mechanism 228, the first drive connection 404 is subsequently driven, thereby effecting movement of the first selector 216.

The first slide 406 is arranged to be at least partially and slidably received within the first channel 212 of the first guide rail 208. In other words, when the first selector 216 is driven by the first drive mechanism 228, the first slide 406 slides within the first channel 212. Further, the first slide 406 slidably supports the first selector 216 on the first guide rail 208. In some embodiments, the first slide 406 may have a cross-sectional geometry that matches a cross-sectional geometry of the first channel 212, such that the first slide 406 slidably fits in the first channel 212. In some embodiments, the cross-sectional geometry of the first slide 406 may be wedge shaped. Further, the first channel 212 may be arranged to restrict movement of the first slide 406, such that the first slide 406 moves substantially along the length of the first channel 212. Thus, the movement of the first selector 216 is restricted by the movement of the first slide 406. In some embodiments, the first slide 406 moves along the first axis B-B', and, consequently, the first selector 216 moves along the first axis B-B'. It is noted that alternatively, the first slide 406 could also comprise a linear bearing.

In this embodiment, the first selector 216 further comprises the first flag 408. The first flag 408 is arranged to be at least partially received between the first pair of sensor elements 314 (shown in FIG. 3) of the first sensor 310 of one of the feeders 202 when the first selector 216 is at a proximal location to the one feeder 202, such that, at the proximal location, the first selector 216 is engaged with the feeder 202. Further, the first sensor 310 is arranged to generate the signal indicative of the engagement of the first selector 216 with the feeder 202 when the respective first pair of sensor elements 314 at least partially receives the first flag 408 therebetween.

Similarly, the second selector 218 comprises the second connector 424, a second suspension 428 and the second guide coupler 416. The second guide coupler 416 further comprises a second drive connection 418 and a second slide 420. The second selector 218 further comprises the second flag 422.

The connectors 410, 424 each comprises a filament entrance 412, 426 for selectively receiving the filament 206 from one of the outlets 204. The filament entrance 412, 426 can receive the filament 206 when the respective connector 410, 424 is positioned such that the filament entrance 412, 426 is aligned with the respective outlet 204 of the feeder 202. Further, the sensors 310, 312 are arranged to generate a signal indicative of the engagement of the respective connectors 410, 424 with the feeder 202 when the respective first pair of sensor elements 314 at least partially receives the flags 408, 422 therebetween.

The first suspension 414 is arranged to adjustably couple the first connector 410 to the first guide rail 208, so that a distance between the first guide rail 208 and the first connector 410 is decreased when the two connectors 410, 424 need to pass each other.

The second suspension 428 is arranged to adjustably couple the second connector 424 to the second guide rail 210, so that a distance between the second guide rail 210 and the second connector 424 is decreased. So, both connectors 410, 424 move towards their respective guide rails 208, 210 in case of a conflict (i.e., passing) of the connectors 410, 424.

It is noted that each feeder 202 can engage with only one of the first and second selectors 216, 218 at a given time. Therefore, at a given time, the one feeder 202 engaged with the first selector 216 will be different from the one feeder 202 engaged with the second selector 218. However, one of the feeders 202 may be engaged with both the first and second selectors 216, 218 at different non-overlapping time periods.

In some embodiments, each of the first and second connectors 410, 424 comprises a protrusion arranged to be received in the dock 304 (shown in FIG. 3) of the filament feeder 202. Specifically, the first and second connectors 410, 424 comprise the first and second protrusions 430, 432, respectively. In the embodiment of FIG. 4, the first and second protrusions 430, 432 are disposed around the first and second filament entrances 412, 426, respectively. The first and second connectors 410, 424 further comprise first and second main bodies 431, 433, respectively. The first and second main bodies 431, 433 are connected to the first and second suspensions 414, 428, respectively. The first and second protrusions 430, 432 extend from first and second main bodies 431, 433, respectively. Further, the first and second filament entrances 412, 426 extend through the first and second protrusions 430, 432 and the first and second main bodies 431, 433, respectively, such that the first and second filament entrances 412, 426 communicate with the first and second Bowden tubes 232, 234. Each of the first and second protrusions 430, 432 are arranged to be received in the dock 304 of the respective feeders 202. Specifically, each of the first and second protrusions 430, 432 are arranged to be received in the dock 304 of the respective feeders 202 when the first and second connectors 410, 424 are engaged with the respective feeders 202. When the first protrusion 430 of the first connector 410 is engaged with the dock 304 of the respective feeder 202, the first filament entrance 412 of the first connector 410 is arranged to receive the filament 206 from the outlet 204 of the respective feeder 202, through the first protrusion 430. Similarly, when the second protrusion 432 of the first connector 424 is engaged with the dock 304 of the respective feeder 202, the second filament entrance 426 of the second connector 424 is arranged to receive the filament 206 from the outlet 204 of the respective feeder 202, through the second protrusion 432.

In some embodiments, when each of the first and second protrusions 430, 432 is received in the dock 304 of the respective filament feeder 202, the dock 304 restricts movement of the corresponding one of the first and second protrusions 430, 432 relative to the respective filament feeder 202. Thus, when each of the first and second protrusions 430, 432 is received in the dock 304 of the respective filament feeder 202, the dock 304 restricts movement of the respective one of the first and second selectors 216, 218 relative to the respective filament feeder 202. This may ensure that, once any one of the first and second protrusions 430, 432 is received in the dock 304 of the respective filament feeder 202, the respective one of the first and second selectors 216, 218 is held in place, such that the filament 206 from the respective filament feeder 202 is fed through the respective one of the first and second protrusions 430, 432 without any disturbance or misalignment. Additionally or alternatively, the actuators 224, 226 could be used to (actively) hold the selectors 216, 218 in place when being engaged with one of the feeders 202.

In an embodiment, each of the first and second suspensions 414, 428 comprises a resilient member 434, 436, see FIG. 4. The resilient members 434, 436 are arranged to resiliently deform. When the resilient members 434, 436 resiliently deform, the distance between the guide rails 208, 210 and the respective connectors 410, 424 changes.

In some embodiments, the resilient member 434, 436 comprises a curved member fixedly coupled to the respective connector. FIG. 4 shows an example of resilient members 434, 436 comprising first and second curved members 438, 440, respectively. The first and second curved members 438, 440 are fixedly coupled to the first and second connectors 410, 424, respectively. The first and second curved members 438, 440 connect the first and second connectors 410, 424 to the first and second guide couplers 402, 416, respectively. The purpose of having flexible resilient members 434, 436 will be discussed with reference to FIGS. 7A and 7B.

Figure 5:
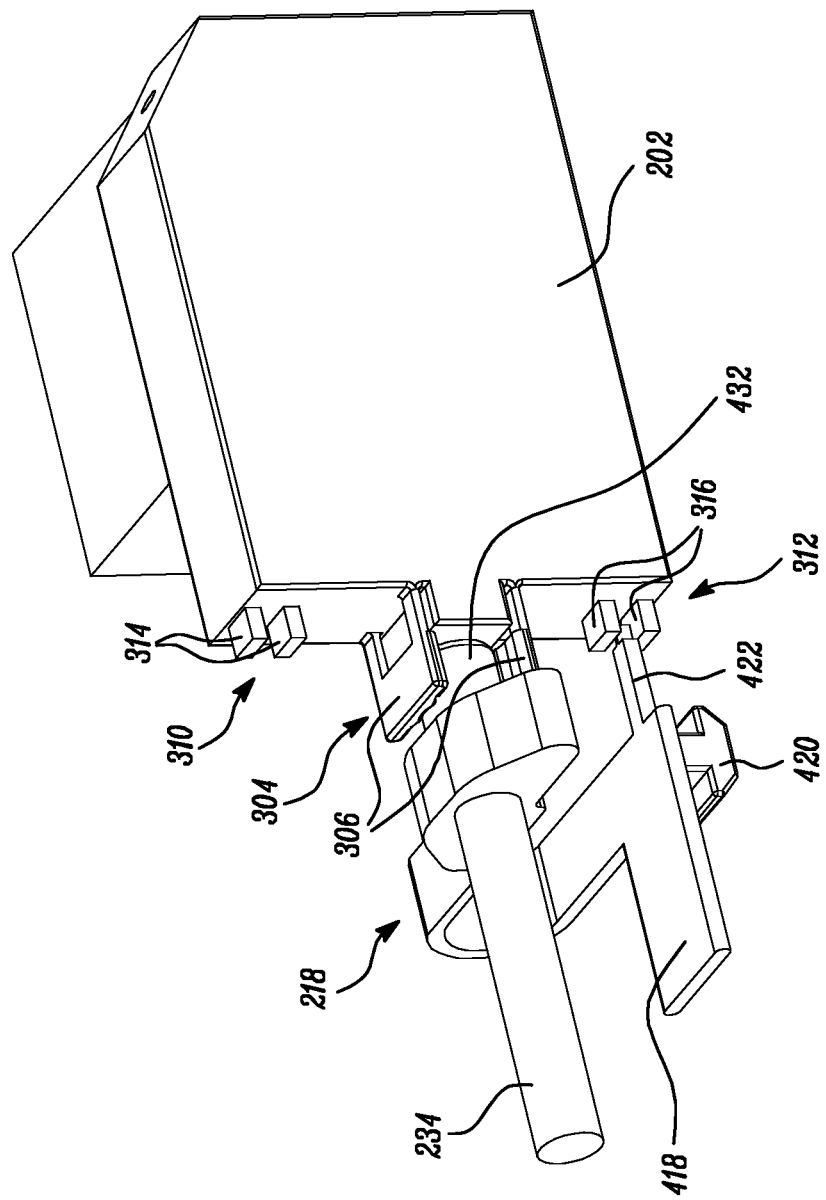
FIG. 5 schematically shows a perspective view an engagement between the selector and the filament feeder, according to an embodiment of the present invention.

FIG. 5 schematically shows a perspective view of engagement of the second selector 218 with one of the feeders 202. As shown, the second protrusion 432 is received by the dock 304 of the feeder 202. Further, the second flag 422 is at least partially received between the second pair of sensor elements 316 of the second sensor 312. In this engaged configuration, the second filament entrance 426, see also FIG. 4, can receive the respective filament 206 from the outlet 204 of the feeder 202, see also FIG. 3. The first selector 216 can be similarly engaged with one of the feeders 202. In that case, the first protrusion 430 is received by the dock 304 of the feeder 202. However, due to the positioning of the first selector 216 relative to the filament feeders 202, the first flag 408 is at least partially received between the first pair of sensor elements 314 of the other sensor, i.e., the first sensor 310.

FIG. 6A schematically shows cross-sectional views of the first and second connectors 410, 424, according to an embodiment of the present invention. In the assembly 200 see also FIG. 2A, the first and second selectors 216, 218 are arranged such that the first and second connectors 410, 424 are arranged in opposing orientations to one another. Referring to FIGS. 4 and 6A, each of the first and second connectors 410, 424 comprises an outer wall. Specifically, the first and second connectors 410, 424 comprise first and second outer walls 602, 604, respectively. The first and second outer walls 602, 604 are part of the first and second main bodies 431, 433, respectively. The first outer wall 602 comprises a first inclined surface 606 at one end. Similarly, the second outer wall 604 comprises a second inclined surface 608 at one end. The first and second inclined surface 606, 608 are configured to selectively and slidingly engage with each other when the first and second connectors 410, 424 pass each other. In the illustrated embodiment of FIG. 6A, the first and second inclined surfaces 606, 608 have substantially similar shapes. In some embodiments, each of the first and second outer walls 602, 604 is wedge shaped. In other words, each of the first and second connectors 410, 424 comprises wedge shaped outer wall 602, 604.

Figure 6B:
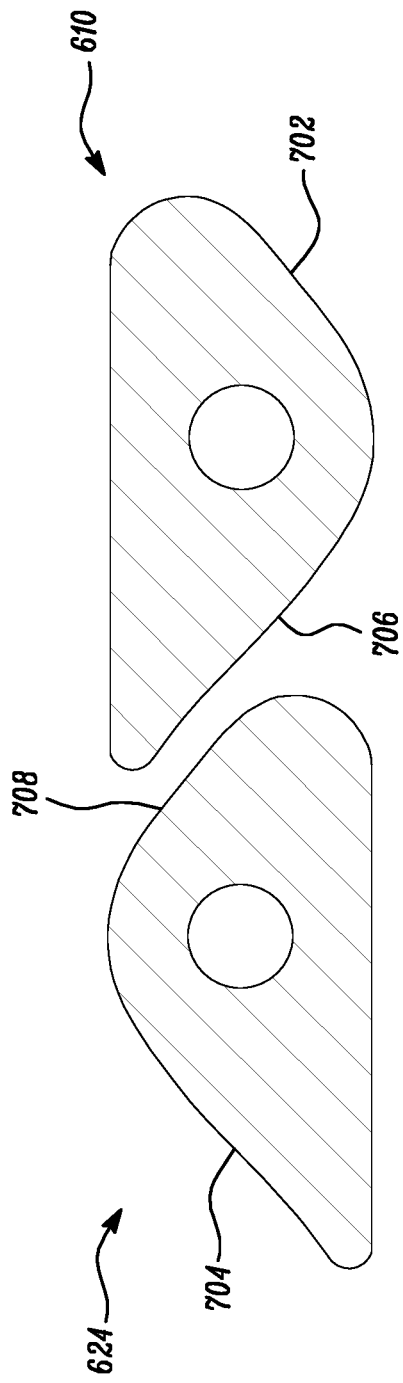
FIG. 6B schematically shows cross-sectional views of the first and second connectors, according to another embodiment of the present invention.

FIG. 6B schematically shows cross-sectional views of first and second connectors 610, 624, according to another embodiment of the present invention. The first and second connectors 610, 624 are functionally similar to the first and second connectors 410, 424, respectively. However, the first and second connectors 610, 624 comprise first and second outer walls 702, 704 having shapes that are different from that of the first and second outer walls 602, 604 of the first and second connectors 410, 424, respectively. Further, the first outer wall 702 comprises a first inclined surface 706 at one end. Similarly, the second outer wall 704 comprises a second inclined surface 708 at one end. The first and second inclined surface 706, 708 are configured to selectively and slidingly engage with each other when the first and second connectors 610, 624 pass each other. In the illustrated embodiment of FIG. 6B, the first and second inclined surfaces 706, 708 have different shapes. The first and second outer walls 702, 704 may be wedge shaped.

Figure 6C:
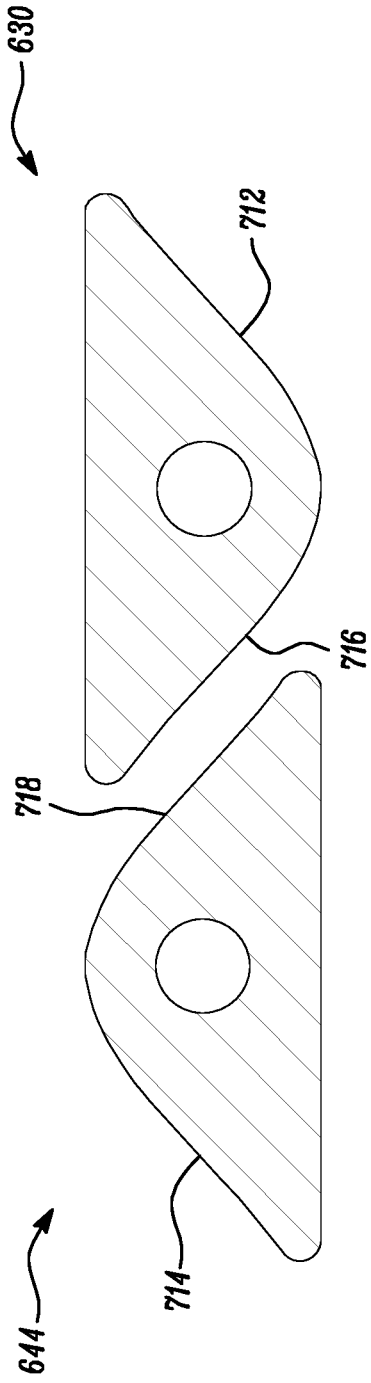
FIG. 6C schematically shows cross-sectional views of the first and second connectors, according to another embodiment of the present invention.

FIG. 6C schematically shows cross-sectional views of first and second connectors 630, 644 according to another embodiment of the present invention. The first and second connectors 630, 644 are functionally similar to the first and second connectors 410, 424, respectively. However, the first and second connectors 630, 644 comprise first and second outer walls 712, 714 having shapes that are different from that of the first and second outer walls 602, 604 of the first and second connectors 410, 424, respectively. In the illustrated embodiment of FIG. 6C, each of the first and second outer walls 712, 714 has an axis of symmetry passing through a center of the corresponding first and second connector 630, 644. Specifically, each of the first and second outer walls 712, 714 may have a substantially symmetric triangular cross-sectional shape. Further, the first outer wall 712 comprises a first inclined surface 716 at one end. Similarly, the second outer wall 714 comprises a second inclined surface 718 at one end. The first and second inclined surface 716, 718 are configured to selectively and slidingly engage with each other when the first and second connectors 630, 644 pass each other. In the illustrated embodiment of FIG. 6C, the first and second inclined surfaces 716, 718 have substantially similar shapes.

Figure 7A:
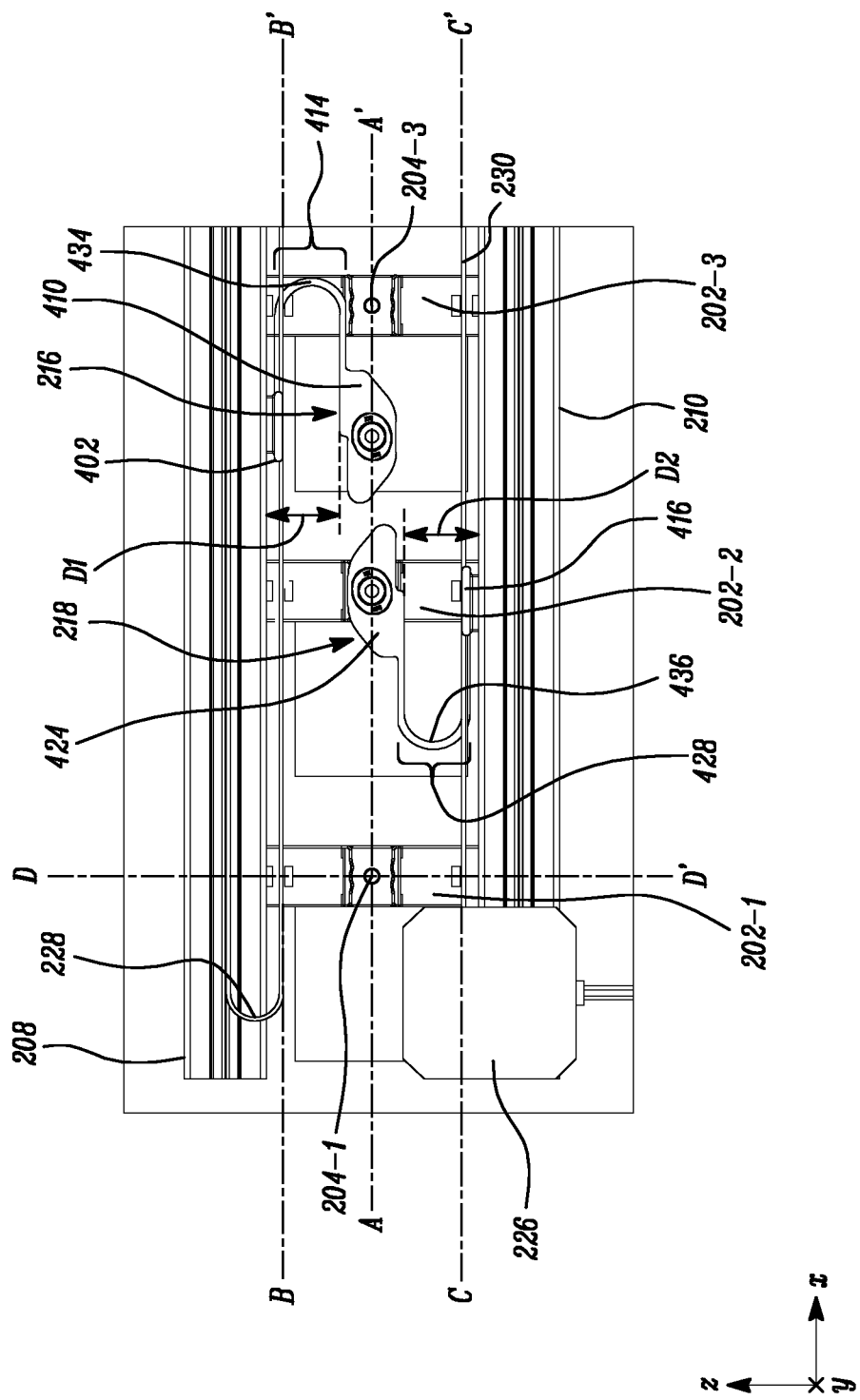
FIG. 7A schematically shows a front view of a part of the filament feeding assembly when the first and second selectors are in respective normal states, according to an embodiment of the present invention.

FIG. 7A schematically shows a front view of a part of the filament feeding assembly 200 when the first and second selectors 216, 218 are in respective normal states. In the example of FIG. 7A, the first selector 216 is not engaged with any of the feeders 202 whereas the second selector is engaged with the feeder 202-2. In the normal state, the distance between the first connector 410 and the first guide rail 208 is equal to a distance D1. The distance D1 may correspond to a minimum distance between the first connector 410 and the first guide rail 208 along the z-axis when the first connector 410 is in the normal state. The distance D1 may further correspond to an offset between the straight line A-A' and the first axis B-B' along the z-axis. Further, in the normal state, the distance between the second connector 424 and the second guide rail 210 is equal to a distance D2. The distance D2 may correspond to a minimum distance between the second connector 424 and the second guide rail 210 along the z-axis when the second connector 424 is in the normal state. The distance D2 may further correspond to an offset between the straight line A-A' and the second axis C-C', along the z-axis.

Figure 7B:
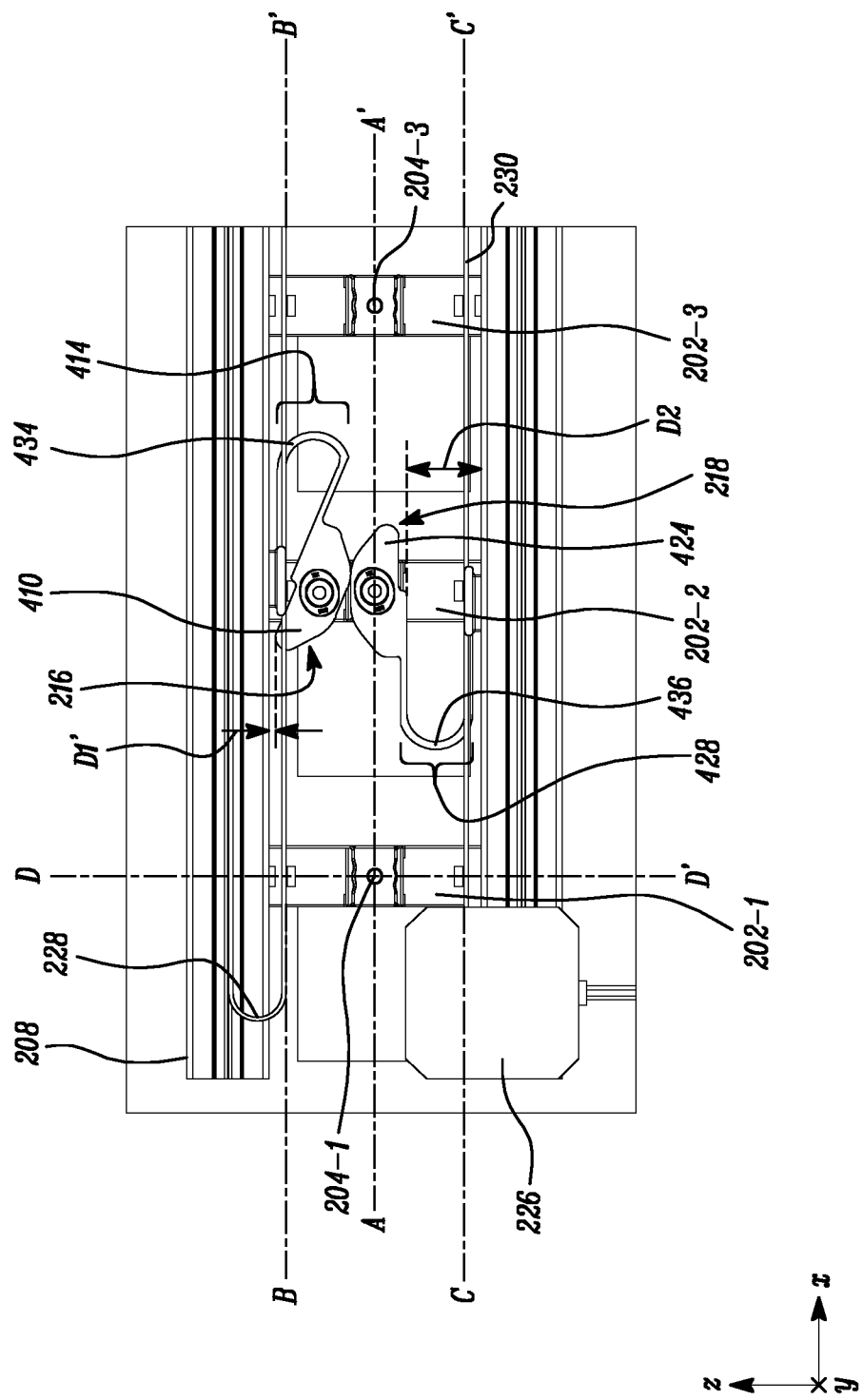
FIG. 7B schematically shows a front view of a part of the filament feeding assembly when the first and second selectors are passing each other, according to an embodiment of the present invention.

FIG. 7B schematically shows a front view of a part of the filament feeding assembly 200 when the first and second selectors 216, 218 are in the process of passing each other. The first and second selectors 216, 218 are arranged to pass each other by way of adjusting one of the first and second suspensions 414, 428. Specifically, the first and second connectors 410, 424 are arranged to pass each other by way of adjusting the distance between the first connector 410 and the first guide rail 208 and/or adjusting the distance between the second connector 424 and the second guide rail 210. In some embodiments, the resilient members 434, 436 are arranged to resiliently deform along an adjustment axis D-D', where the adjustment axis D-D' is substantially along the z-axis.

In the illustrated embodiment of FIG. 7B, the second selector 218 is engaged with the second feeder 202-2. The first selector 216 is shown to be passing over the second selector 218, as the first selector 216 is moving towards the first feeder 202-1. In such a case, due to forces applied by the second connector 424 onto the first connector 410 (and vice versa), the first suspension 414 of the first selector 216 is adjusted such that the first connector 410 is moved towards the first guide rail 208, and away from the straight line A-A'. This will allow the first connector 410 to move over the second connector 424 and pass the second connector 424. Further, the first suspension 414 is adjusted when the first resilient member 434 resiliently deforms. The first resilient member 434 is arranged to resiliently deform when the outer wall 602 of the first connector 410 pushes against the outer wall 604 of the second connector 424.

Referring to FIGS. 7A and 7B, due to the resilient deformation of the first resilient member 434, the distance between the first connector 410 and the first guide rail 208 can be adjusted from the distance D1 to a distance D1'. The distance D1' may correspond to a minimum distance between the first connector 410 and the first guide rail 208 along the z-axis when the first connector 410 is displaced from the normal state. Since the first connector 410 moves towards the first guide rail 208, the distance D1' is less than the distance D1. The wedge-shaped outer walls 602, 604 may enable the movement of the first connector 410 towards the first guide rail 208 upon engagement between the first and second connectors 410, 424. The resilient deformation of the first resilient member 434 allows the first guide coupler 402 to remain drivingly engaged with the first guide rail 208 even through the first connector 410 is displaced from the normal state. Further, the second connector 424 remains engaged with the feeder 202-2 even though the first connector 410 is displaced. The engagement between the second protrusion 432 and the dock 304 (shown in FIG. 5) allows the second connector 424 to remain engaged with the feeder 202-2 when the first connector 410 contacts the second connector 424 and passes over the second connector 424. Therefore, a filament feeding operation to the second connector 424 will not be affected by the passing of the first connector 410 over the second connector 424. Once the first connector 410 has passed over the second connector 424, the first resilient member 434 returns to an undeformed state, thereby allowing the first connector 410 to return to the normal state/place. In some cases, the first connector 410 may be engaged with any one of the feeders 202 (e.g., the feeder 202-2), while the second connector 424 may not be engaged with any of the feeders 202. The second connector 424 may be required to move past the first connector 410 to engage with any other feeder (e.g., the feeder 202-3). In such a case, the second suspension 428 of the second selector 218 is adjusted such that the second connector 424 moves towards the second guide rail 210, and away from the straight line A-A'. This may allow the second connector 424 to move past the first connector 410. Further, the second suspension 428 is adjusted when the second resilient member 436 resiliently deforms. The second resilient member 436 is arranged to resiliently deform when the outer wall 604 of the second connector 424 pushes against the outer wall 602 of the first connector 410.

Figure 8:
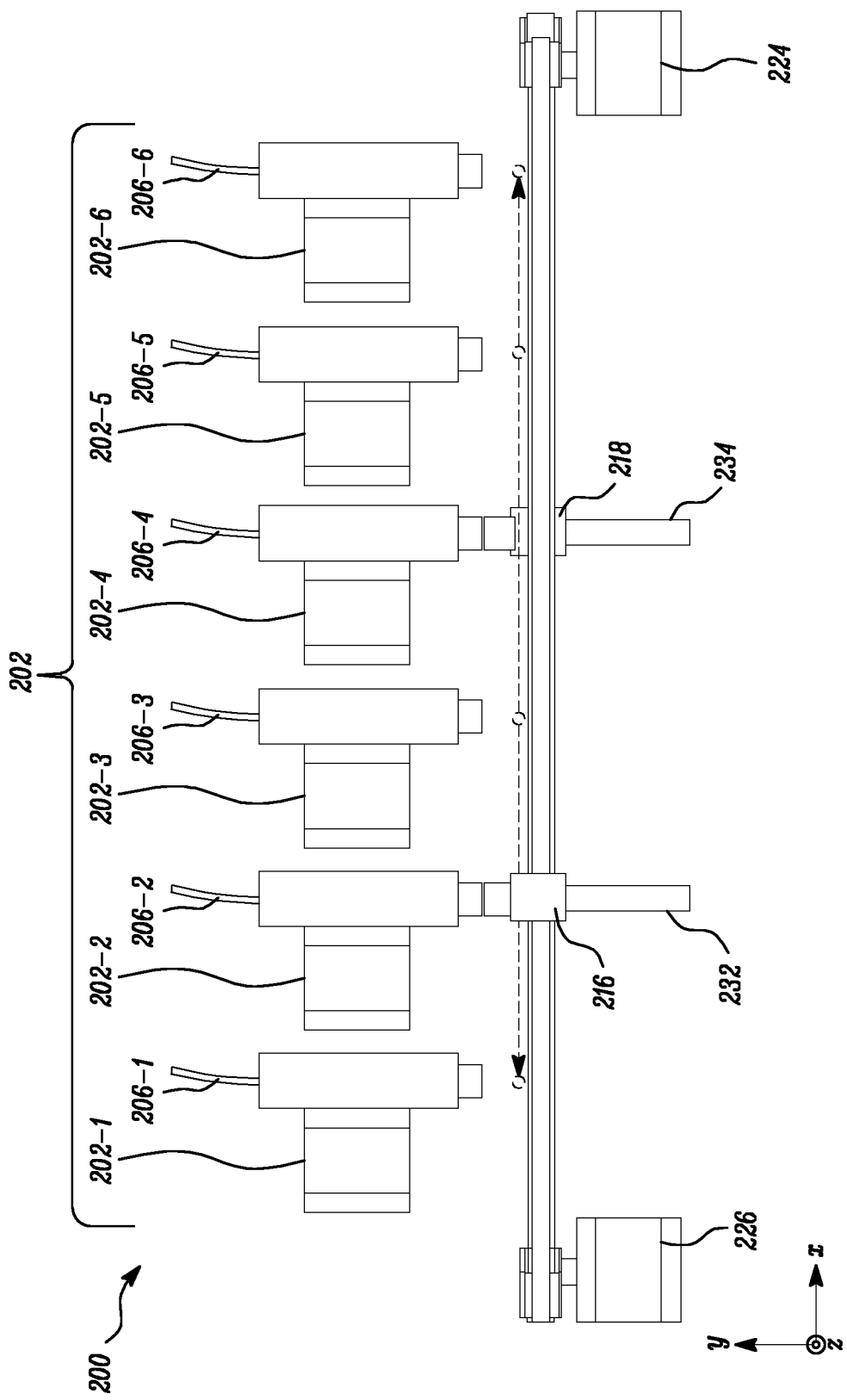
FIG. 8 schematically shows a top view of another filament feeding assembly, according to an embodiment of the present invention.

FIG. 8 schematically shows a top view of the filament feeding assembly 200. As can be seen from FIG. 8, the first and second selectors 216, 218 in fact move back and forth along the same trajectory. This means that they will have to pass each other in case the first selector 216 needs to engage with a feeder that is, at a certain moment in time, located at the other side of the second selector 218. The first and second selectors 216, 218 are driven by the first and second actuators 224, 226, respectively. So, by using just two actuators 224, 226 and two almost identical selection means (i.e., the first and second selectors 216, 218), a very compact and functional filament feeding assembly 200 is realized, which enables a flexible way of feeding six (or any other number) filaments into two Bowden tubes 232, 234 for feeding the dual extruder print head 102.

If one of the selectors 216, 218 encounters an obstruction or the end stop of an axis (A-A and B-B) the counter electro magnetic force detected by the actuators, may be used to indicate the mechanical load on the actuator and may trigger a specific set of controls for controlling the filament feeding assembly 200.

Figure 9:
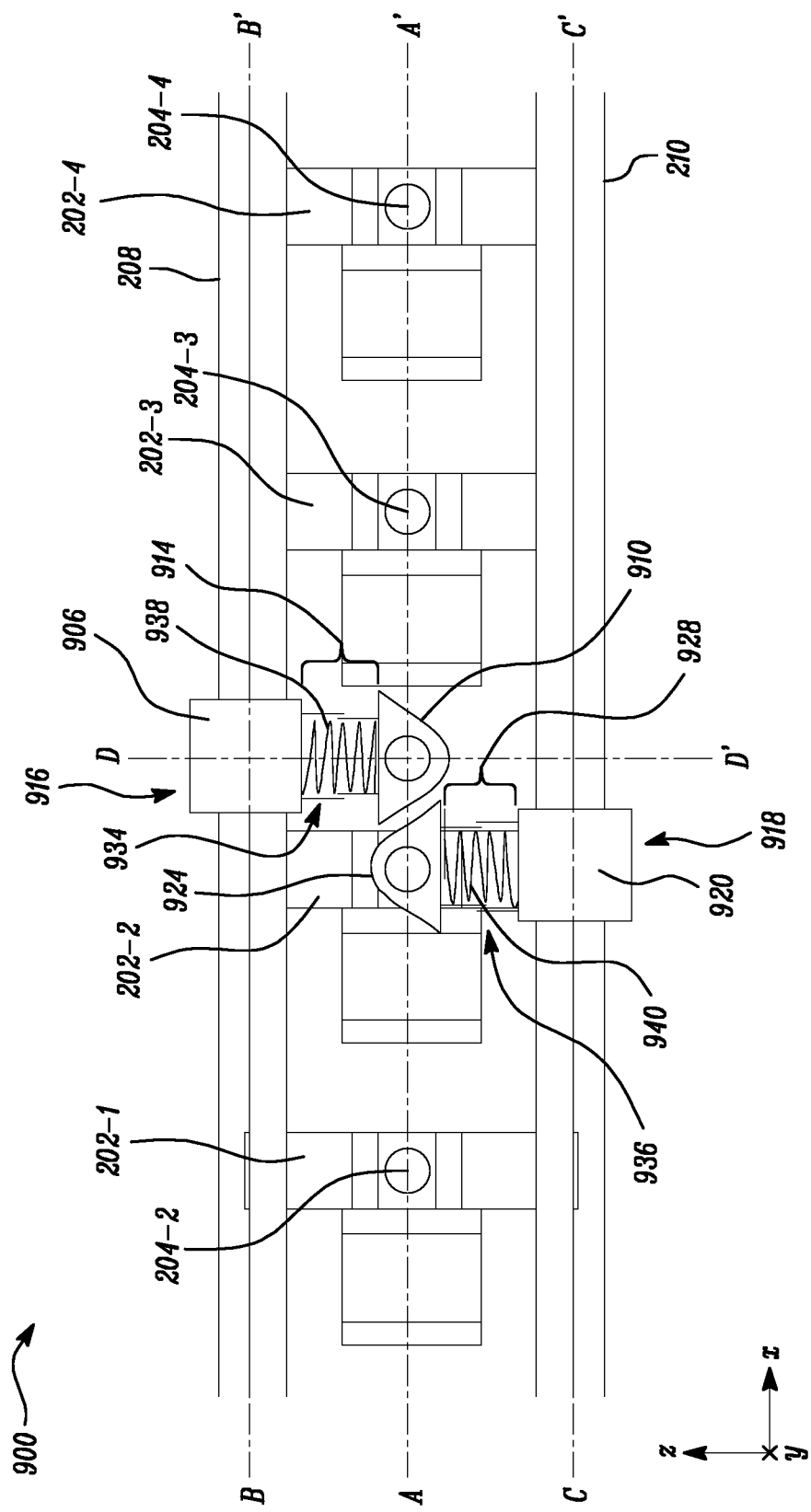
FIG. 9 schematically shows a front view of another filament feeding assembly, according to an embodiment of the present invention.

FIG. 9 schematically shows a front view of part of a filament feeding assembly 900 of the FFF system 100, according to a further embodiment. The filament feeding assembly 900 is substantially similar to the assembly 200 shown in FIGS. 2A-2C, and common components are assigned the same reference numerals. Some components (e.g., the drive mechanisms) of the filament feeding assembly 900 are not shown in FIG. 9 for illustrative purposes. The filament feeding assembly 900 comprises a first selector 916 and a second selector 918 equivalent to the first selector 216 and the second selector 218, respectively. The first selector 916 is movably coupled to the first guide rail 208 and comprises a first connector 910, a first guide coupler 906 and a first suspension 914 equivalent to the first connector 410, the first guide coupler 402 and the first suspension 414, respectively, of the first selector 216. The second selector 918 is movably coupled to the second guide rail 210 and comprises a second connector 924, a second guide coupler 920 and a second suspension 928 equivalent to the second connector 424, the second guide coupler 416 and the second suspension 428, respectively, of the second selector 218. The first suspension 914 comprises a first resilient member 934. The second suspension 928 comprises a second resilient member 936.

In the filament feeding assembly 900, each of the first and second resilient members 934, 936 comprises a coil spring. Specifically, the resilient members 934, 936 of the first and second selectors 916, 918 comprise first and second coil springs 938, 940, respectively. When the first coil spring 938 selectively compresses, a distance between the first connector 910 and the first guide rail 208 is adjusted. Similarly, when the second coil spring 940 selectively compresses, a distance between the second connector 924 and the second guide rail 210 is adjusted. In some embodiments, the first and second coil springs 938, 940 are arranged to compress and extend along the adjustment axis D-D', where the adjustment axis D-D' is substantially along the z-axis.

Figure 10:
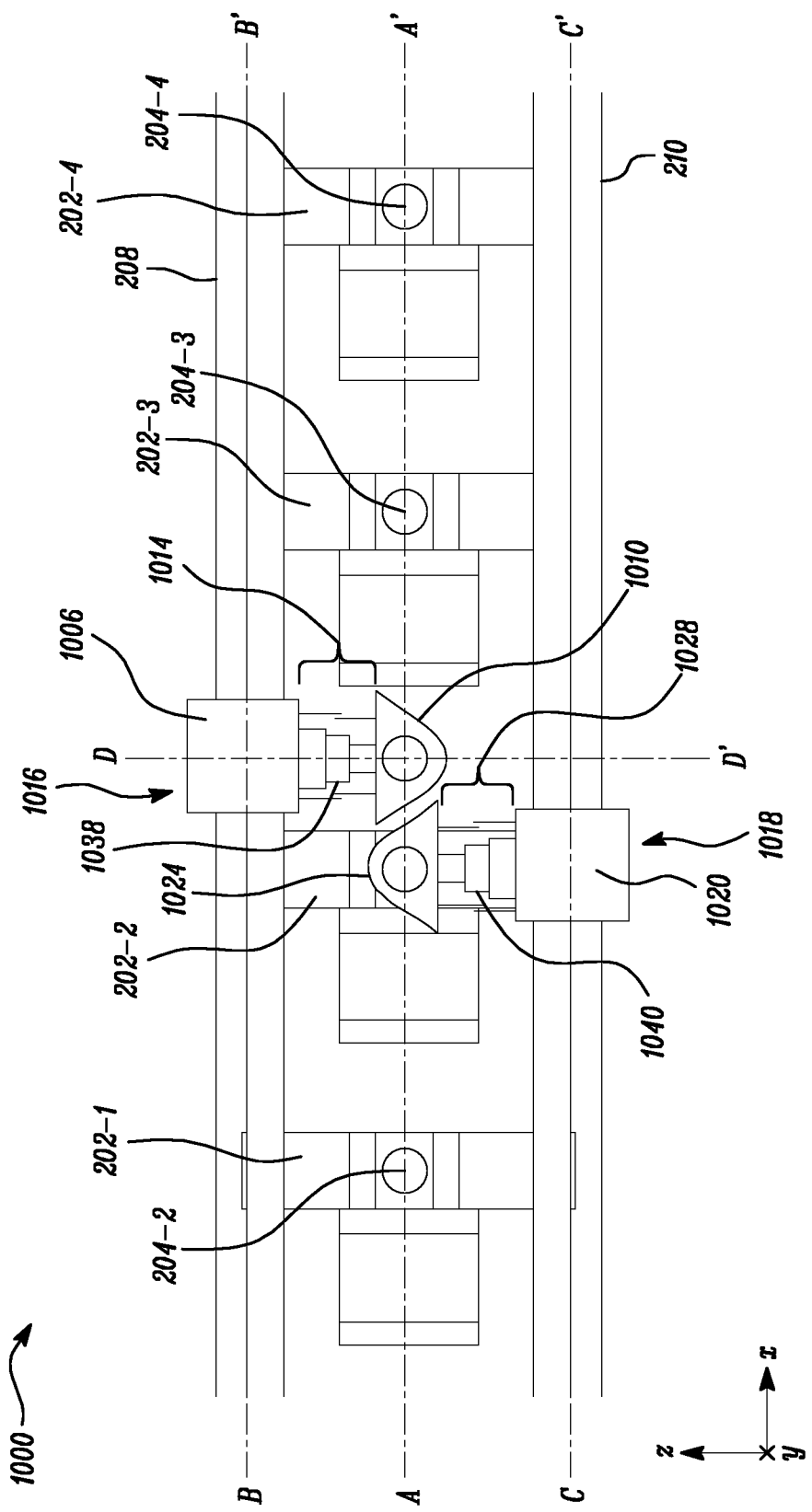
FIG. 10 schematically shows a front view of another filament feeding assembly, according to an embodiment of the present invention.

FIG. 10 schematically shows a front view of a filament feeding assembly 1000 of the FFF system 100, according to another embodiment. The filament feeding assembly 1000 is substantially similar to the assembly 200 shown in FIGS. 2A-2C, and common components are assigned the same reference numerals. Some components (e.g., the drive mechanisms) of the filament feeding assembly 1000 are not shown in FIG. 10 for illustrative purposes. The filament feeding assembly 1000 comprises a first selector 1016 and a second selector 1018 equivalent to the first selector 216 and the second selector 218, respectively. The first selector 1016 is movably coupled to the first guide rail 208 and comprises a first connector 1010, a first guide coupler 1006 and a first suspension 1014 equivalent to the first connector 410, the first guide coupler 402 and the first suspension 414, respectively, of the first selector 216. The second selector 1018 is movably coupled to the second guide rail 210 and comprises a second connector 1024, a second guide coupler 1020 and a second suspension 1028 equivalent to the second connector 424, the second guide coupler 416 and the second suspension 428, respectively, of the second selector 218.

In the filament feeding assembly 1000, each of the first and second suspensions 1014, 1028 comprises a telescoping mechanism. Specifically, the first and second suspensions 1014, 1028 comprises first and second telescoping mechanisms 1038, 1040, respectively. When the first telescoping mechanism 1038 selectively compresses, a distance between the first connector 1010 and the first guide rail 208 is adjusted. Similarly, when the second telescoping mechanism 1040 selectively compresses, a distance between the second connector 1024 and the second guide rail 210 is adjusted. In some embodiments, the first and second telescoping mechanisms 1038, 1040 are arranged to retract and extend along the adjustment axis D-D', where the adjustment axis D-D' is substantially along the z-axis. In some embodiments, the first and second telescoping mechanisms 1038, 1040 may be actuated through actuators (not shown). The actuators may comprise electrical actuators, pneumatic actuators, hydraulic actuators, or combination thereof. It is noted that in some embodiments only one of the suspensions 1014, 1028 may comprise a telescoping mechanism while the second one may comprise another type of suspension such as a curved member, as was shown in FIG. 4, or a coil spring, as was shown in FIG. 9.

In an embodiment, the filament feeding assembly 200, 900, 1000 comprises a controller 1102 (see FIG. 11) arranged to determine target feeders from the plurality of filament feeders for the connectors. The controller 1102 is arranged to control the actuators to move each of the associated connectors to one of the target feeders.

Figure 11:
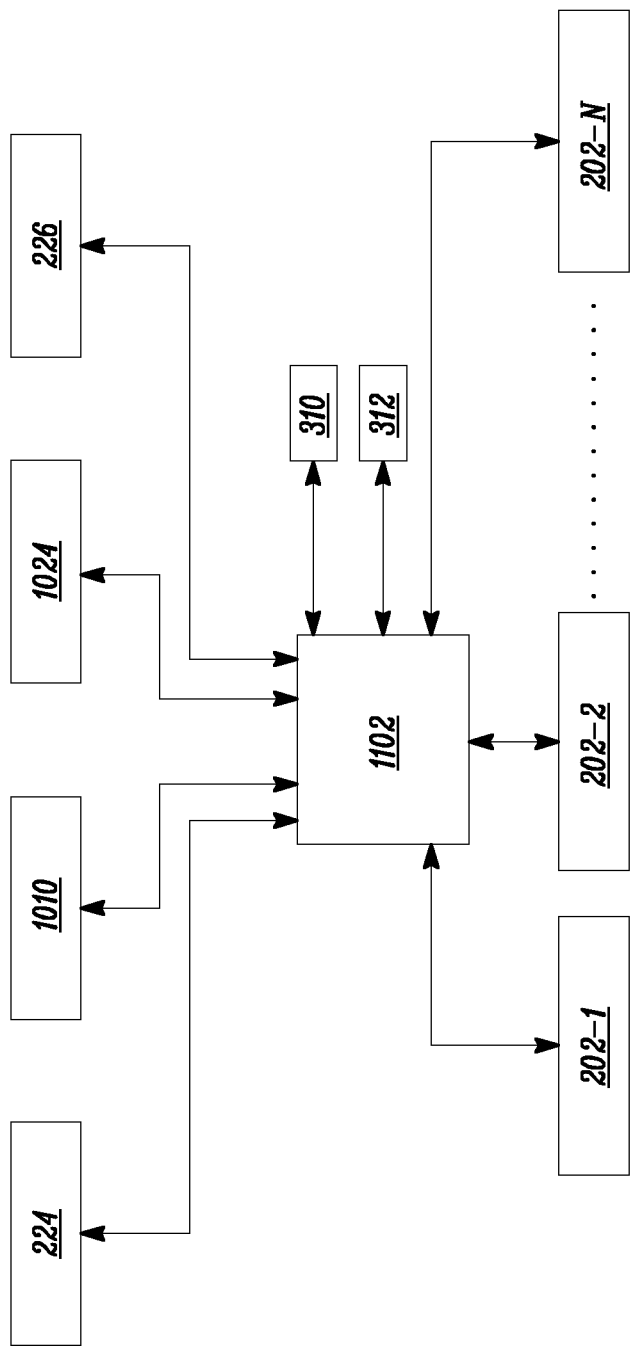
FIG. 11 schematically shows a controller of the filament feeding assembly, according to an embodiment of the present invention.

FIG. 11 schematically shows the controller 1102 of the filament feeding assembly 200 (shown in FIGS. 2A-2C). The controller 1102 is communicably coupled with the components of the filament feeding assembly 200. Specifically, the controller is communicably coupled with the plurality of feeders 202, the first and second selectors 216, 218 (shown in FIGS. 2A-2C), the first and second actuators 224, 226 (shown in FIGS. 2A-2C), and the first and second sensors 310, 312 (shown in FIG. 3) of each feeder 202. The controller 1102 is arranged to determine target feeders from the plurality of filament feeders 202 for the connectors 1010, 1024 (shown in FIG. 10). The target feeders may be determined by controller 1102 using instructions received by the FFF system 100, or the controller 1102 may be arranged to communicate with other controllers of the FFF system 100 to receive information relating to identities of target feeders for the selectors 216, 218 to engage with. The controller 1102 is further arranged to control the actuators 224, 226 to move each of the associated connectors 1010, 1024 to one of the target feeders. The controller 1102 is further arranged to determine that the connectors 1010, 1024 are engaged with the target feeders using, e.g., input received from the sensor 310, 312. The controller 1102 may further be arranged to operate the target feeders to feed filament 206 through the connectors 1010, 1024.

The controller 1102 may include a processor (not shown) and a memory (not shown) storing executable instructions. The processor may execute the instructions stored in the memory to implement a method or an algorithm.

Referring to FIGS. 10 and 11, the controller 1102 is arranged to move at least the first connector 1010 towards one of the target feeders. In this embodiment wherein the suspension 1014, 1028 comprises an active element such as the telescoping mechanisms 1038, 1040, the controller 1102 may further be arranged to determine that the first connector 1010 is proximal to the second connector 1024 using, e.g., data received from the two actuators 224, 226. The controller 1102 will then control the first suspension 1014, such that the first connector 1010 is retracted towards the first guide rail 208, in order to allow the first connector 1010 to pass the second connector 1024. The controller 1102 will then control the first suspension 1014 such that the first connector 1010 moves to a non-retracted state after the first connector 1010 has passed the second connector 1024. The non-retracted state of the first connector 1010 may correspond to the normal state where the first connector 1010 is arranged to move along the straight line A-A' in front of the plurality of outlets 204.

FIG. 12 schematically shows a state diagram 1200 for one of the feeders of the filament feeding assembly 200. The state diagram may be loaded into the controller 1102 (see FIG. 11) of the filament feeding assembly 200, 900, 1000 for proper operation of the filament feeding assembly 200, 900, 1000. The state diagram 1200 depicts operation of one of the feeders 202 of the filament feeding assembly 200 (shown in FIGS. 2A-2C). The state diagram 1200 comprises a feeder state diagram 1202 depicting operation of the plurality of feeders 202 and a selector state diagram 1250 depicting operation of the first and second selectors 216, 218 (shown in FIGS. 2A-2C). The feeder state diagram 1202 comprises a first feeder state 1204, where the feeder 202 is not operational. The feeder state diagram 1202 proceeds to a second feeder state 1206. At the second feeder state 1206, the feeder 202 has been selected as a target feeder 202 for at least one of the first and second selectors 216, 218.

Referring to the selector state diagram 1250, at a first selector state 1252, the first and second selectors 216, 218 may be at any unknown positions. Once, a target feeder is selected for at least one of the first and second selectors 216, 218 (refer to the second feeder state 1206), at a second selector state 1254, the at least one of first and second selectors 216, 218 is moved towards the respective target feeder 202. At a third selector state 1256, the at least one of first and second selectors 216, 218 is docked with the target feeder 202. Docking may be confirmed by signals received from the at least one sensor 310, 312 on the target feeder 202. Further, there may be a change in the target feeder 202, in which case, the at least one of first and second selectors 216, 218 is moved to engage with the changed target feeder 202.

Referring to the feeder state diagram 1202, once the at least one of first and second selectors 216, 218 is docked with the respective target feeder 202, at a third feeder state 1208, the filament from the respective target feeder 202 is dispensed. It is noted that the feeder state diagram 1202 may comprise further states following state 1208 related to the loading of filament and the printing steps.

The filament feeding assembly 200, 900, 1000 of the present invention may allow selective feeding of any two filaments 206 from a plurality of filaments 206. The filament feeding assembly 200, 900, 1000 comprises the first and second selectors 216, 218 that are movable in the filament feeding assembly 200, 900, 1000, and are arranged to move to and selectively engage with the plurality of feeders 202 and receive respective filaments 206 therefrom. Each of the first and second selectors 216, 218 may comprise the respective Bowden tube 232, 234 that transports the filament 206 received at the respective selector 216, 218. The filament 206 may be transported to a secondary feeder and then to the print head 102 of the FFF system 100, or directly to the print head 102 of the FFF system 100. In the case the print head 102 of the FFF system 100 is a dual extruder print head, each selector 216, 218 feeds filaments 206 to one of the extruders. The filament feeding assembly 200, 900, 1000 is arranged, such that filament 206 is fed to one of the extruders of the print head 102 through common channels, through one of the selectors 216, 218. As a result, characteristics of the filament 206 being fed through to the print head 102, such as friction values and feed force values, are similar, irrespective of the feeder from where the filament is fed. This may allow the FFF system 100 to extrude the filaments 206 more uniformly. Further, since there is a single path, from a selector, for the filament to traverse, the FFF system 100 comprising the proposed filament feeding assembly 200, 900, 1000 may not require a merger. This may further reduce friction that may otherwise occur due to movement of the filament through the merger.

The present invention has been described above with reference to a number of exemplary embodiments as shown in the drawings. Modifications and alternative implementations of some parts or elements are possible and are included in the scope of protection as defined in the appended claims. It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A filament feeding assembly for a fused filament fabrication system the filament feeding assembly comprising a plurality of filament feeders arranged next to each other in a row, wherein each filament feeder comprises an outlet and wherein the respective outlets of the filament feeders are aligned on a straight line;

a first guide rail and a second guide rail, both being arranged parallel to the straight line;

a first selector comprising a first connector movably coupled to the first guide rail and comprising a first filament entrance for selectively receiving a filament from one of the outlets, and a first suspension arranged to adjustably couple the first connector to the first guide rail, so that a distance between the first guide rail and the first connector is adjustable;

a second selector comprising a second connector movably coupled to the second guide rail and comprising a second filament entrance for selectively receiving a filament from one of the outlets, and a second suspension arranged to adjustably couple the second connector to the second guide rail, so that a distance between the second guide rail and the second connector is adjustable; and two actuators, each being arranged to move one of the connectors in front of the respective outlets of the filament feeders;

wherein the first and second connectors are arranged to pass each other by way of adjusting the distance between the first connector and the first guide rail and/or adjusting the distance between the second connector and the second guide rail.

2. The filament feeding assembly according to claim 1, wherein each of the first and second connectors comprises a wedge-shaped outer wall, and wherein each of the first and second suspensions comprises a resilient member, and wherein the resilient member is arranged to resiliently deform when the outer wall of the first connector pushes against the outer wall of the second connector.

3. The filament feeding assembly according to claim 2, wherein the resilient member comprises a curved member fixedly coupled to the respective connector.

4. The filament feeding assembly according to claim 2, wherein the resilient member comprises a coil spring.

5. The filament feeding assembly according to claim 1, wherein at least one of the first and second suspensions comprises a telescoping mechanism.

6. The filament feeding assembly according to claim 1, wherein each of the filament feeders comprises a dock, and wherein each of the connectors comprises a protrusion arranged to be received in the dock of the filament feeder.

7. The filament feeding assembly according to claim 1, wherein each of the filament feeders comprises a sensor arranged to generate a signal indicative of an engagement of one of connectors with the filament feeder.

8. The filament feeding assembly according to claim 1, further comprising a controller arranged to:
determine target filament feeders from the plurality of filament feeders for the connectors;
control the actuators to move each of the associated connectors to one of the target feeders;
determine that the connectors are engaged with the target feeders; and
operate the target feeders to feed filament through the connectors.

9. The filament feeding assembly according to claim 8, wherein the controller is further arranged to:
move at least the first connector towards one of the target feeders;
determine that the first connector is proximal to the second connector;
control the first suspension, such that the first connector is retracted towards the first guide rail, in order to allow the first connector to pass the second connector; and
control the first suspension, such that the first connector moves to a non-retracted state after the first connector has passed the second connector.

10. A fused filament fabrication system comprising the filament feeding assembly according to claim 1.

* * * * *